(12) United States Patent
Miyata et al.

(10) Patent No.: US 11,297,015 B2
(45) Date of Patent: Apr. 5, 2022

(54) MESSAGE PROVIDING DEVICE FOR REGISTERING SETTING INFORMATION OF CHATBOT FOR EACH USER AND NON-TRANSITORY COMPUTER READABLE MEDIUM STORING PROGRAM

(71) Applicant: FUJIFILM Business Innovation Corp., Tokyo (JP)

(72) Inventors: Shigeo Miyata, Kanagawa (JP); Hiroyuki Mitsuhashi, Kanagawa (JP); Xiaojing Zhang, Kanagawa (JP); Shiori Oikawa, Kanagawa (JP); Yu Mishima, Kanagawa (JP); Hideaki Sugimoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 452 days.

(21) Appl. No.: 16/208,586

(22) Filed: Dec. 4, 2018

(65) Prior Publication Data

US 2019/0288962 A1  Sep. 19, 2019

(30) Foreign Application Priority Data

Mar. 16, 2018  (JP) .............................. JP2018-049682

(51) Int. Cl.
| | |
|---|---|
| *H04L 12/58* | (2006.01) |
| *G06K 15/02* | (2006.01) |
| *G06F 3/12* | (2006.01) |
| *H04L 51/02* | (2022.01) |
| *H04L 51/18* | (2022.01) |

(52) U.S. Cl.
CPC ............ *H04L 51/02* (2013.01); *G06F 3/1238* (2013.01); *G06F 3/1256* (2013.01); *G06F 3/1285* (2013.01); *G06K 15/1807* (2013.01); *H04L 51/18* (2013.01)

(58) Field of Classification Search
None
See application file for complete search history.

(56) References Cited

U.S. PATENT DOCUMENTS

| | | | |
|---|---|---|---|
| 9,325,651 B2 | 4/2016 | Sakuta et al. | |
| 2019/0250864 A1* | 8/2019 | Sugai | ................... H04N 1/0044 |
| 2019/0258431 A1* | 8/2019 | Yamamoto | ............ G06F 3/1204 |

FOREIGN PATENT DOCUMENTS

JP  2014164522  9/2014

* cited by examiner

*Primary Examiner* — Thomas D Lee
(74) *Attorney, Agent, or Firm* — JCIPRNET

(57) ABSTRACT

A message providing device includes a receiving section that receives a registration request for setting information regarding an operation of a software robot program for each user, the software robot program operating on a message service in which a message is transmitted and received between users, to transmit and receive the message to and from a user, a registration section that registers setting information for a first user in association with identification information of the first user, in response to the registration request from the first user, and a control section that performs control such that at least a portion of the registered setting information for the first user is registered as setting information for a second user in association with identification information of the second user, corresponding to transmission and reception of a message between the first user or the second user, and the software robot program.

18 Claims, 20 Drawing Sheets

| | USER | PRINTER | COLOR | SIZE | NUMBER OF COPIES |
|---|---|---|---|---|---|
| 001 | USER A | PRINTER A | COLOR | A4 | 1 |
| 002 | USER B | PRINTER B | BLACK AND WHITE | Letter | 2 |
| ... | | | | | |

| | USER | PRINTER | COLOR | SIZE | NUMBER OF COPIES |
|---|---|---|---|---|---|
| 001 | USER A | PRINTER A | COLOR | A4 | 1 |
| 002 | USER B | PRINTER A | COLOR | A4 | 1 |
| ... | | | | | |

| | USER | PRINTER | COLOR | SIZE | NUMBER OF COPIES | CONFIRMATION |
|---|---|---|---|---|---|---|
| 001 | USER A | PRINTER A | COLOR | A4 | 1 | |
| 002 | USER B | PRINTER A | COLOR | A4 | 1 | x |
| ... | | | | | | |

| | USER | PRINTER | COLOR | SIZE | NUMBER OF COPIES | CONFIRMATION |
|---|---|---|---|---|---|---|
| 001 | USER A | PRINTER A | COLOR | A4 | 1 | |
| 002 | USER B | PRINTER A | COLOR | A4 | 1 | O |
| ... | | | | | | |

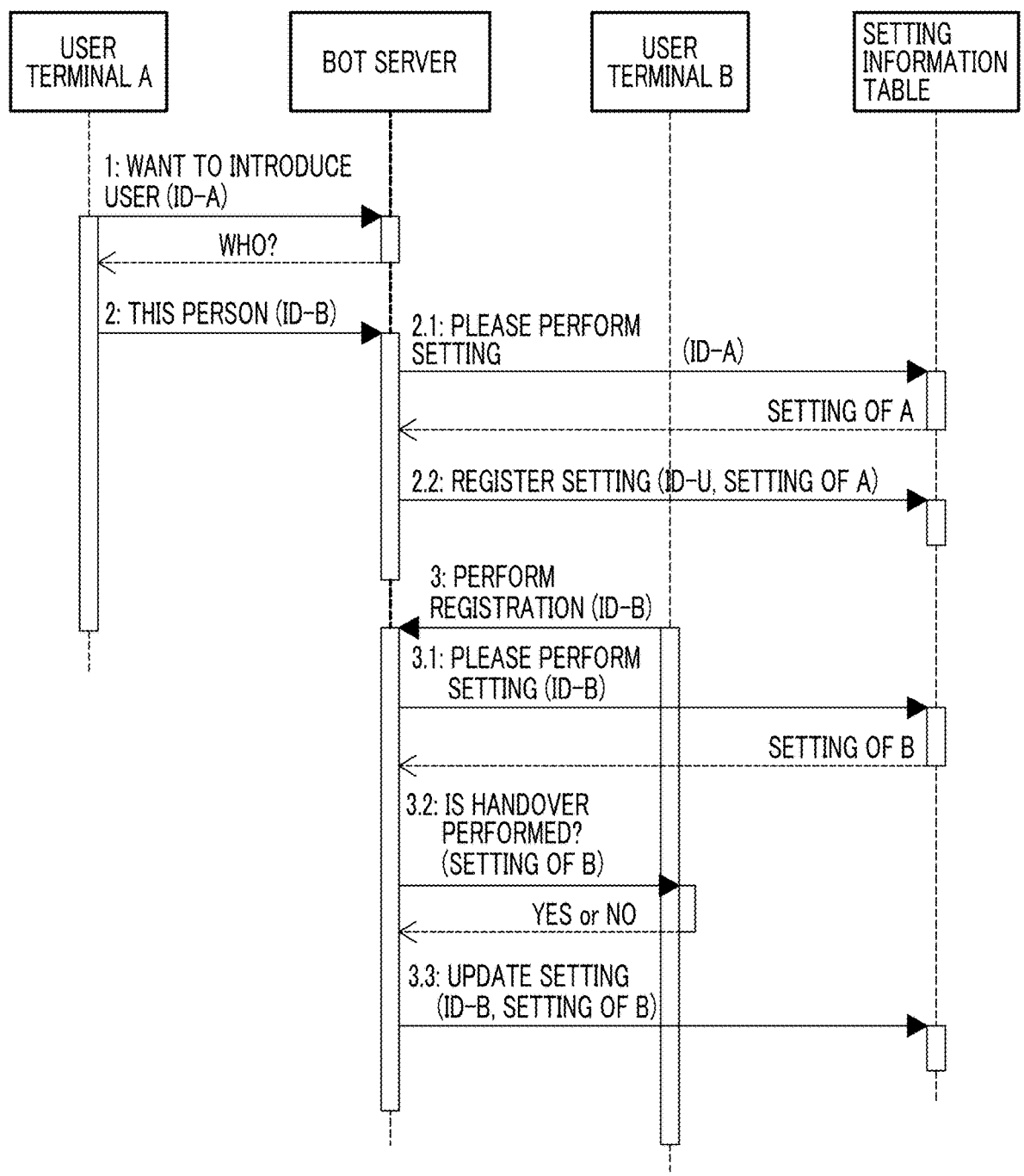

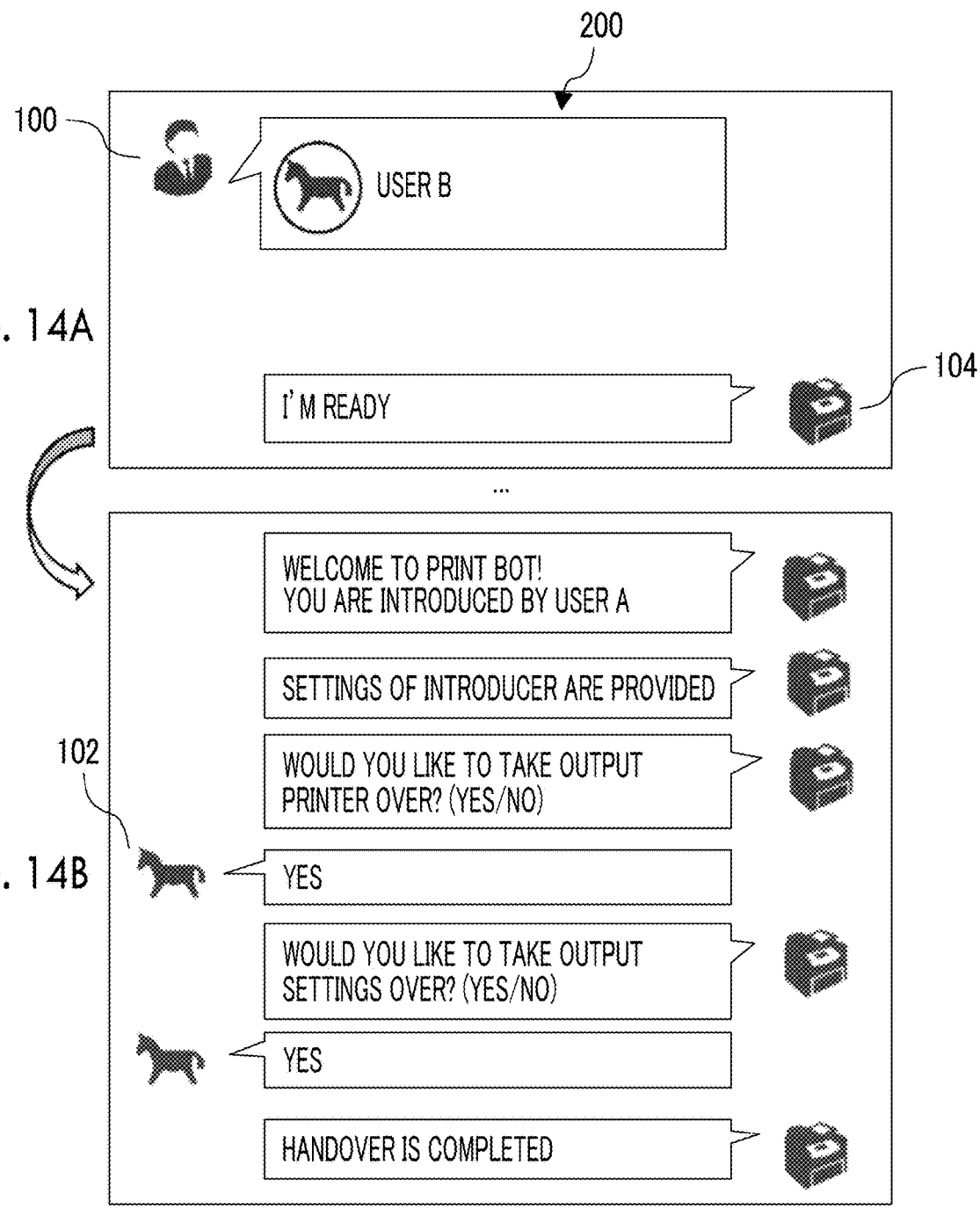

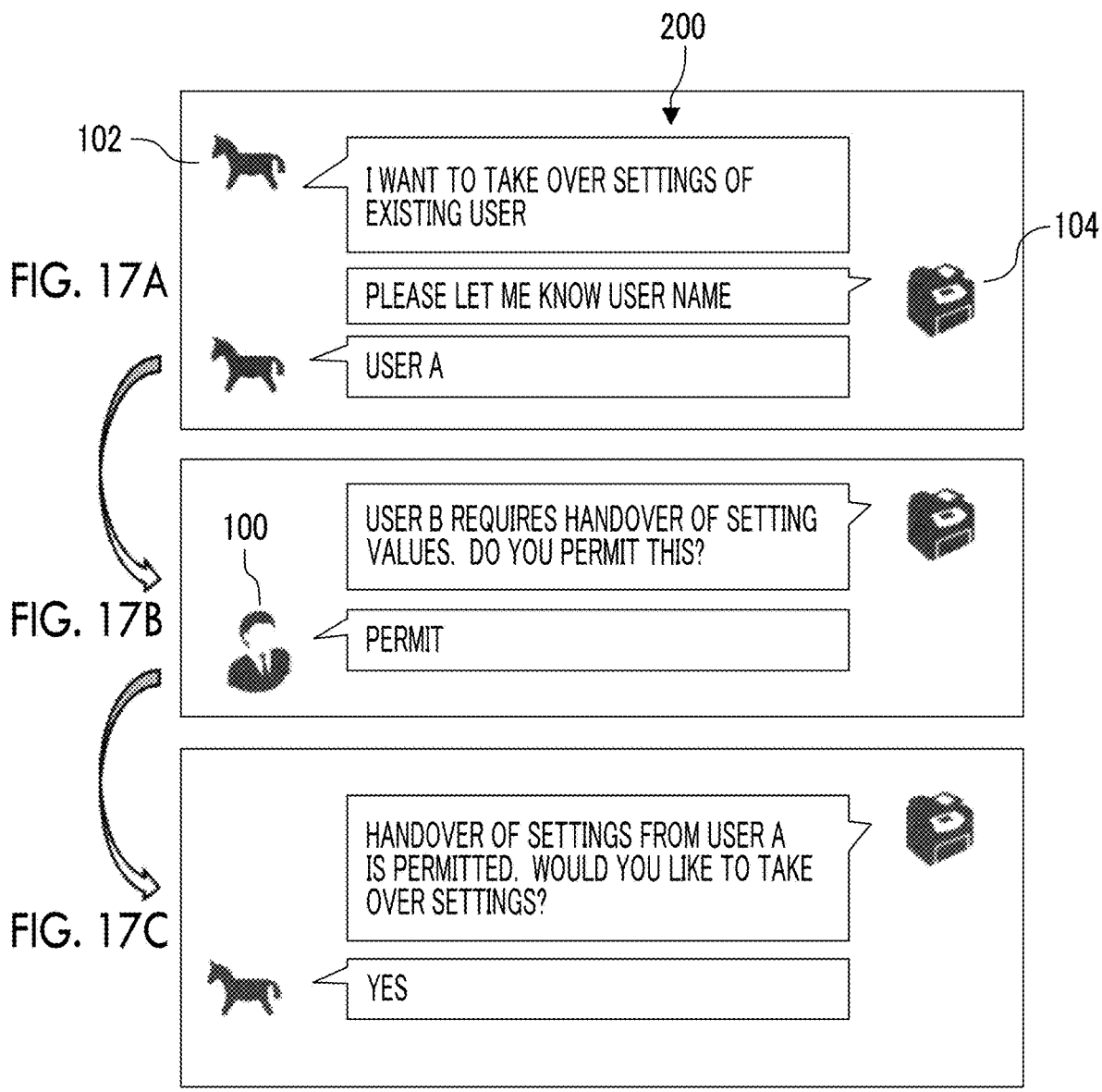

MESSAGE PROVIDING DEVICE FOR REGISTERING SETTING INFORMATION OF CHATBOT FOR EACH USER AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-049682 filed Mar. 16, 2018.

BACKGROUND

(i) Technical Field

The present invention relates to a message providing device and a non-transitory computer readable medium storing a program.

(ii) Related Art

JP2014-164522A discloses a message notification device that performs notification of a message that reports a result of an operation instruction from a user with an explicit indication of a destination of the message. An operation instruction detection unit detects an operation instruction from a message and specifies a member who has written the message as an instructor. A report message display unit visually shows a message indicating a result obtained by an operation in accordance with the operation instruction, on a family message board in a state where the instructor is described as a destination.

In a message service such as a chatting or a social networking service (SNS), in which a message is transmitted and received between users, a software robot program (referred to as "a chatbot" below) is proposed. The chatbot operates on the message service and is designed (personified) in order to simulate a dialogue with a person with sound or texts. The chatbot operates to detect a specific word or phrase from a message input from a user and to output a response which has been prepared in advance corresponding to the detected word or phrase. For the chatbot, messenger service accounts assigned for advertisements or commercials, such as companies or stores are operated. A user can enjoy talking with the chatbot through natural message exchange, and can cause the chatbot to execute various services.

SUMMARY

For example, in a case where a user causes a software robot program to execute a desired service, it is necessary that setting information regarding an operation of the software robot program is registered for each user in advance. Even in a case where a user wants to use setting information as same as setting information registered by another user, it is necessary that the user registers the setting information all over again. In a case where many items to be registered are provided as the setting information, the registration procedure becomes more complicated.

Aspects of non-limiting embodiments of the present disclosure relate to a message providing device and a non-transitory computer readable medium storing a program in which a labor on which a user registers setting information all over again in a case where the user wants to use the setting information as same as setting information registered by another user in a software robot program requiring registration of the setting information regarding an operation thereof is reduced.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided a message providing device which includes a receiving section that receives a registration request for setting information regarding an operation of a software robot program for each user, the software robot program operating on a message service in which a message is transmitted and received between users, to transmit and receive the message to and from a user, a registration section that registers setting information for a first user in association with identification information of the first user, in response to the registration request from the first user, and a control section that performs control such that at least a portion of the registered setting information for the first user is registered as setting information for a second user in association with identification information of the second user, corresponding to transmission and reception of a message between the first user or the second user, and the software robot program.

BRIEF DESCRIPTION OF THE DRAWINGS

Exemplary embodiment(s) of the present invention will be described in detail based on the following figures, wherein:

FIG. 13 is a sequence chart of the second exemplary embodiment;

FIGS. 14A and 14B are diagrams illustrating a display of a screen of a user terminal in a third exemplary embodiment;

FIGS. 17A to 17C are diagrams illustrating a display of a screen of a user terminal in a fifth exemplary embodiment;

DETAILED DESCRIPTION

Hereinafter, exemplary embodiments of the present invention will be described with reference to the drawings, by using an example in which a chatbot that provides a print service in accordance with a message from a user is used.

First Exemplary Embodiment

Figure 1:
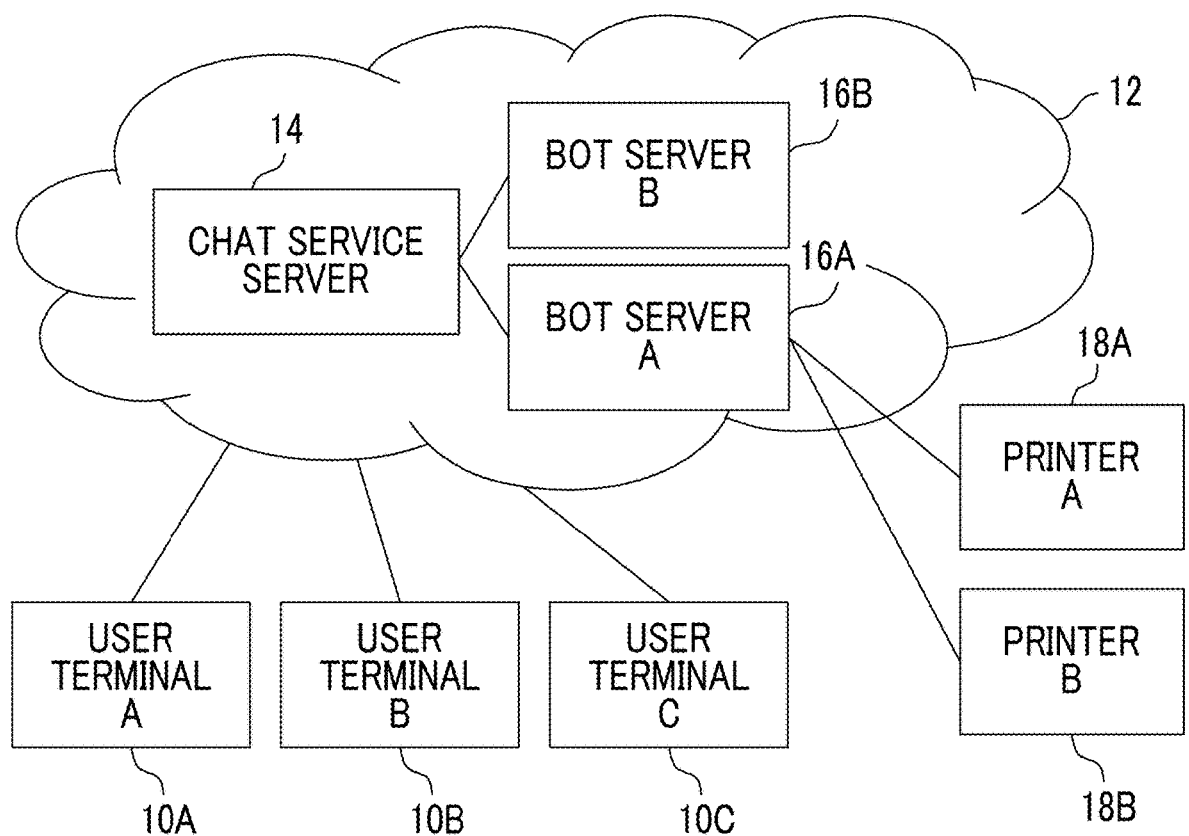
FIG. 1 is a system configuration diagram according to a first exemplary embodiment.

FIG. 1 is an overall configuration diagram illustrating a message service system according to an exemplary embodiment. The message service system includes a user terminal A (10A) to a user terminal C (10C), a chat service server 14, a bot server A (16A) and a bot server B (16B), and a printer A (18A) and a printer B (18B).

The user terminal A (10A) to the user terminal C (10C) are terminals used by a user of a message service. Information terminals such as smartphones, tablet terminals, or personal computers (PCs) are provided as the user terminals. FIG. 1 illustrates three terminals of the user terminal A (10A), the user terminal B (10B), and the user terminal C (10C), but the number of user terminals is randomly determined. Users operate the user terminal A (10A) to the user terminal C (10C) to access the chat service server 14 on a cloud 12 and to transmit and receive messages to and from other users or other chatbots. In the following descriptions, it is assumed that a user A operates the user terminal A, a user B operates the user terminal B, and a user C operates the user terminal C. The user terminal A (10A) to the user terminal C (10C) are connected to the chat service server 14 so as to be capable of transmitting and receiving data to and from each other through a wired or wireless communication network. As an example of a communication network, a public line such as the Internet is provided, and a dedicated line may be provided.

The chat service server 14 is a cloud server disposed on the cloud 12, and is a server that provides a chat service. The chat service server 14 includes one or a plurality of server computers. The chat service server 14 performs the whole processing relating to transmission and reception of a message, for the user terminal A to the user terminal C. Examples of the above processing include processing of transmitting and receiving a message and processing of displaying a display screen in message transmission and reception. The chat service server 14 can form a group with three or more users and process transmission and reception of a message in the group (group chat), in addition to processing of transmission and reception of a message between two users. The chat service server 14 cooperates with the bot server A (16A) and the bot server B (16B), and processes transmission and reception of messages to and from chatbots provided by the bot servers 16A and 16B. Transmission and reception of a message between a user and a chatbot includes transmission and reception of a message between one user and a chatbot, and transmission and reception of messages between a plurality of users and a chatbot.

Each of the bot server A (16A) and the bot server B (16B) functions as a message providing device. In a case where a software robot program of a chatbot that transmits and receives a message to and from a user is installed, the bot server A (16A) and the bot server B (16B) execute the program. For the bot server A (16A) and the bot server B (16B), messenger service accounts assigned for advertisements or commercials, such as companies or stores may be operated.

The bot server A (16A) and the bot server B (16B) cooperate with the chat service server 14 via a specific application programming interface (API), and thus transmits and receives a message to and from a user, automatically generates a response to the message from the user, and transmits a message as the response to the user. The specific API is an API for using the chat service server 14. Any format is used for the API. For example, an API of a javascript object notation (JSON) format is used as the API. Thus, JSON data of a prescribed format is transmitted to a specific URL of the chat service server 14 in a manner of POST or GET. A result is received as data of the JSON format.

In a case where an operation instruction is included in a message from a user, the bot server A (16A) and the bot server B (16B) execute contents of a specific service in accordance with the operation instruction. In the exemplary embodiment, in a case where a message from a user includes a printing instruction, the bot server A (16A) functions as "a print bot" that operates the printer A (18A) or the printer B (18B) to perform printing processing, in accordance with the printing instruction. The bot server 16B may provide any service in accordance with an operation instruction from a user. FIG. 1 illustrates two servers of the bot server A (16A) and the bot server B (18B). However, the number of bot servers is randomly determined. A plurality of chatbots may be configured by one bot server, or one chatbot may be configured by a plurality of bot servers.

The bot server A as a chatbot (or a print bot) drives the printer A or the printer B to perform printing processing, according to setting information regarding an operation of the software robot program. The setting information is registered for each user in advance. The setting information can be referred to as an operation condition for operating the printer A or the printer B. A user A operates the user terminal A to input and register setting information for operating the printer A. A user B operates the user terminal B to input and register setting information for operating the printer B.

The printer A (18A) and the printer B (18B) perform printing processing by a command from the bot server A.

Figure 2:
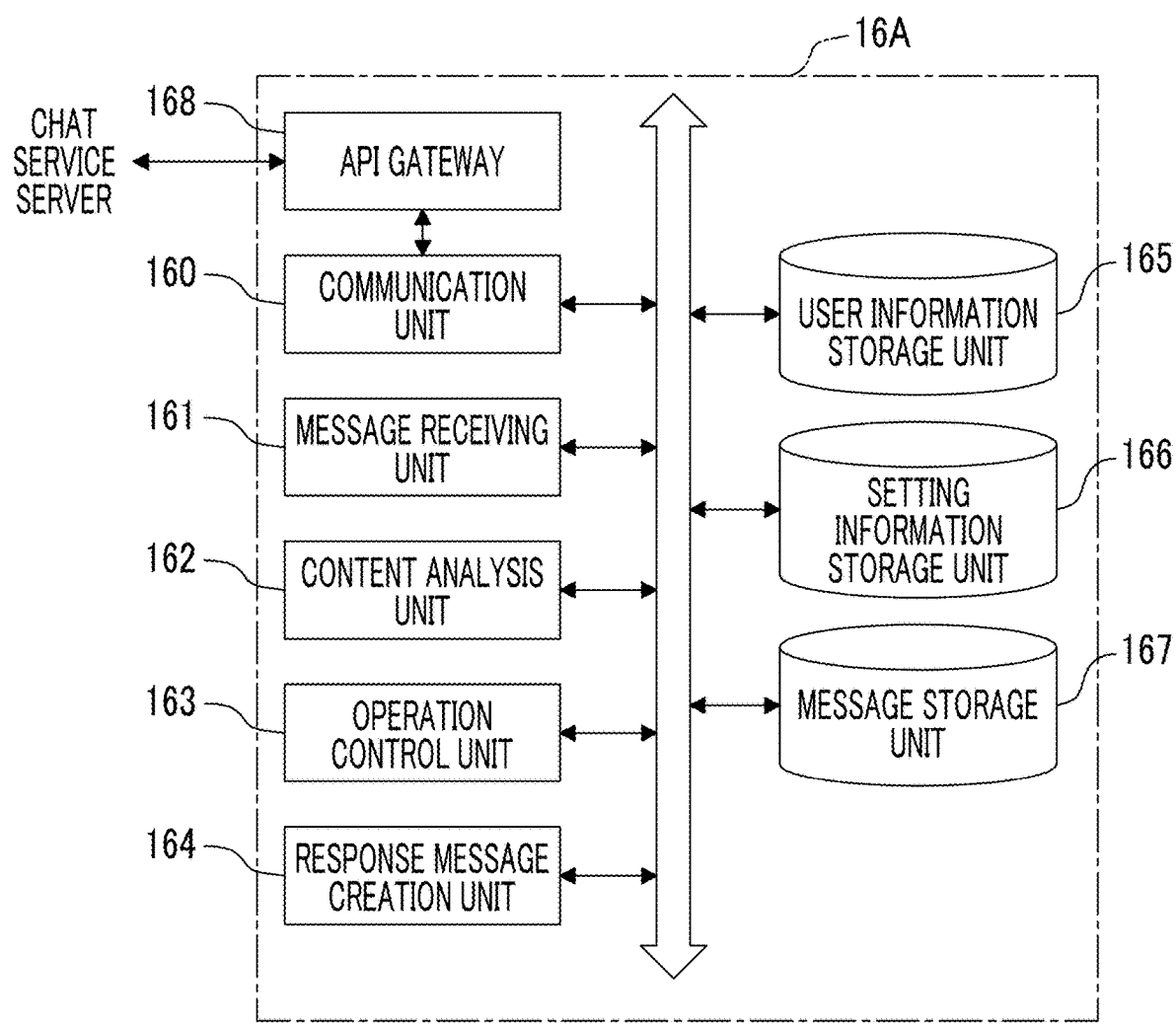
FIG. 2 is a functional block diagram of the first exemplary embodiment.

FIG. 2 is a functional block diagram illustrating the bot server A (16A) as the message providing device. The bot server A includes a communication unit 160, a message receiving unit 161, a content analysis unit 162, an operation control unit 163, a response message creation unit 164, a user information storage unit 165, a setting information storage unit 166, a message storage unit 167, and an API gateway 168 as functional blocks.

The communication unit 160 communicates with the chat service server 14 and the printers A and B. The communication unit 160 communicates with the chat service server 14 to exchange a message, via the API gateway 168. The communication unit 160 outputs a message received from the chat service server 14 via the API gateway 168, that is, a message from each of the user terminal A to the user terminal C, to the message receiving unit 161. The communication unit 160 transmits a response message created by the response message creation unit 164 to the chat service server 14 (that is, transmits the response message to the user terminal A to the user terminal C) via the API gateway 168. The communication unit 160 outputs a print command to the printer A and the printer B so as to drive the printers A and B, according to a command from the operation control unit 163.

The message receiving unit 161 functions as a receiving section, and thus receives a message from the communication unit 160 and outputs the message to the content analysis unit 162. The message includes a message relating to registration of setting information. The message receiving unit 161 sequentially stores the received message in the message storage unit 167.

The content analysis unit 162 analyzes the contents of the received message and outputs the result of the analysis to the operation control unit 163. Specifically, the content analysis unit recognizes a user identifier (user ID) included in the received message. The content analysis unit extracts the text part included in the message and analyzes the syntax of the extracted text part. Any method is used as a method of analyzing the syntax. For example, an input message is decomposed into morpheme units, and then nouns, adjectives, verbs, and question pronouns are extracted as keywords. In a case where the text part of a message includes an operation instruction, the content analysis unit 162 analyzes the contents of the operation instruction and outputs the result of the analysis to the operation control unit 163. In the exemplary embodiment, the operation instruction includes printing instructions for the printers A and B or instructions regarding pieces of setting information of the printers A and B.

The operation control unit 163 functions as a registration section and a control section to register setting information regarding operations of the printers A and B, in the setting information storage unit 166 based on an analysis result obtained by the content analysis unit 162. The operation control unit 163 outputs a print command to the printers A and B via the communication unit 160.

The response message creation unit 164 creates a response message in accordance with the analysis result in the content analysis unit 162, and transmits the created response message to the chat service server 14 via the communication unit 160. In particular, the response message creation unit 164 creates a response message corresponding to a keyword such as "introduction" or "handover" included in a message from the user. Specifically, the response message creation unit creates a response message such as "please a user who wants to register the printer respond", corresponds to keywords such as "chat room" and "wanting to introduce a user", which are included in a message of "wanting to introduce a user in a chat room" from a user. In addition, the response message creation unit creates a response message such as "please tell me user name", corresponding to keywords such as "existing user", "setting", and "want to hand over", which are included in a message of "wanting to hand over settings of the existing user" from a user.

The user information storage unit 165 stores information of a user using the chat service server 14, in particular, information of a user using a chatbot realized by the bot server A, in a form of a table. Regarding the chatbot, a specific account on a chat service realized by the chat service server 14 is assigned, and a user designates the account and performs a predetermined operation (for example, operation meaning "friend" registration). In this manner, using the chatbot is determined. The user information is, for example, a user ID. The user information storage unit may store information regarding the authority of each user.

The setting information storage unit 166 stores setting information of each user using the chatbot realized by the bot server A, in a form of a table. As items of the setting information, for example, identification information of a printer to be used, a color mode, a paper size, and the number of sheets are provided. However, it is not limited thereto. As will be described later, the setting information may be determined in accordance with the contents of a service provided by the bot server A. In a case of a print service, the setting information is information regarding printing. In a case of a search service, the setting information is information regarding a search condition. The setting information is information for defining the contents of a service and may include a plurality of items.

The message storage unit 167 stores a message from a user, which has been received by the message receiving unit 161, as a history.

Figure 3:
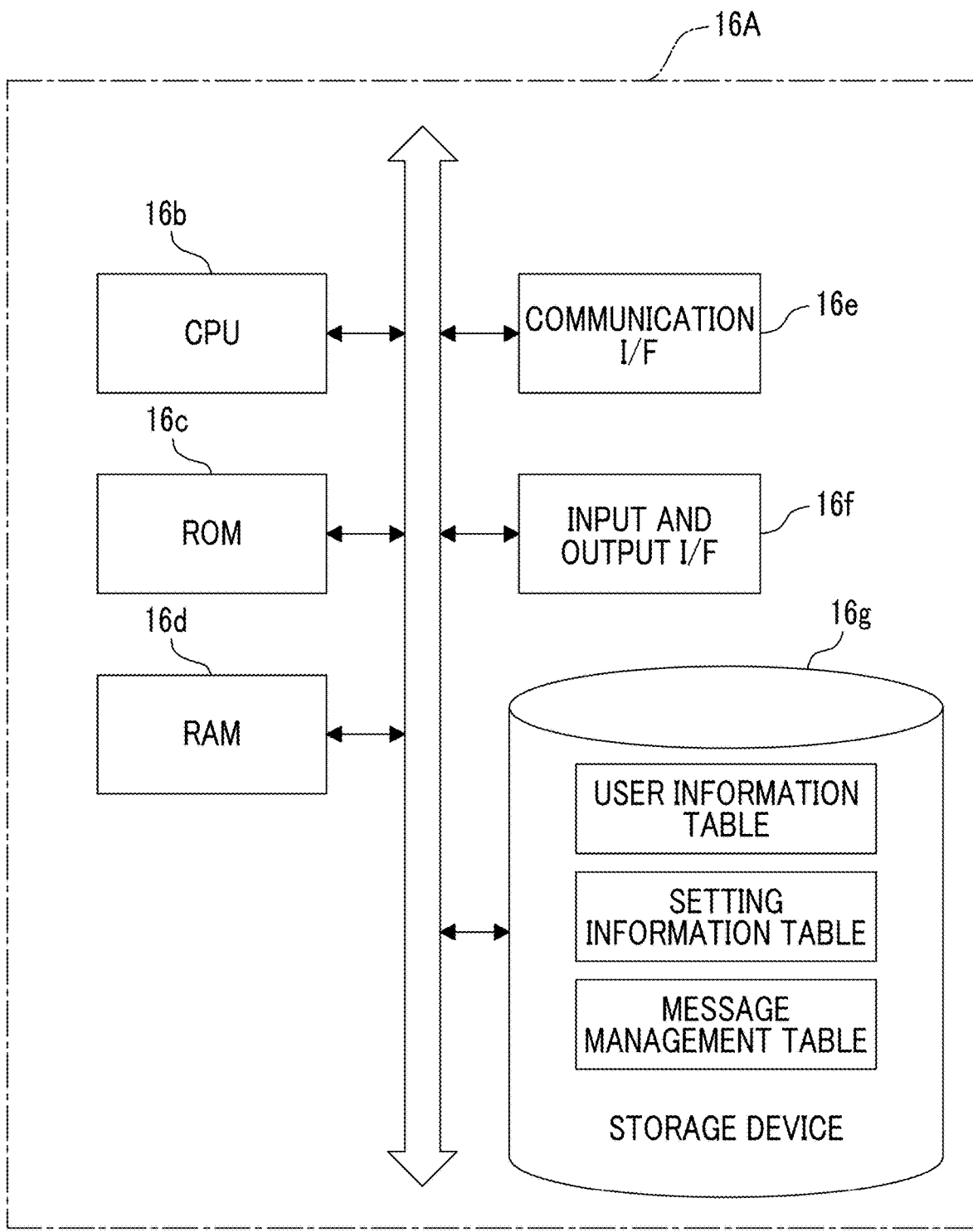
FIG. 3 is a configuration block diagram of the first exemplary embodiment.

FIG. 3 is a configuration block diagram illustrating the bot server A. The bot server A is configured with one or a plurality of server computers. The bot server A includes one or a plurality of CPUs 16b, ROMs 16c, and RAMS 16d, a communication interface (I/F) 16e, an input and output I/F 16f, and a storage device 16g.

The one or a plurality of CPUs 16b realizes the function as the chatbot by reading a bot application stored in the ROM 16c or the storage device 16g and using the RAM 16d as a working memory. That is, the CPU 16b automatically responds to a message from a user. In a case where the message from the user includes an operation instruction, the CPU 16b drives the printers A and B in accordance with the operation instruction. The CPU 16b executes the bot application to realize the message receiving unit 161, the content analysis unit 162, the operation control unit 163, the response message creation unit 164, and the API gateway 168 in FIG. 2.

The communication I/F 16e transmits and receives a message to and from the chat service server 14 and outputs a print command to the printers A and B.

The input and output I/F transmits and receives data to and from an input device such as a keyboard or a mouse, and an output device such as a display device.

The storage device 16g is configured with a non-volatile memory such as a hard disk drive (HDD) or a solid state drive (SSD). The storage device 16g stores the bot application and stores a user information table, a setting information table, and a message management table. The storage device 16g realizes the user information storage unit 165, the setting information storage unit 166, and the message storage unit 167 in FIG. 2.

In the exemplary embodiment, the CPU executes the software robot program for realizing the chatbot. However, a portion of the chatbot may be realized by hardware processing not processing by executing the program. The hardware processing may be performed, for example, by using a circuit such as an ASIC or a field programmable gate array (FPGA).

Next, registration of setting information will be described with a user A and a user B as an example.

Figures 4, 5:
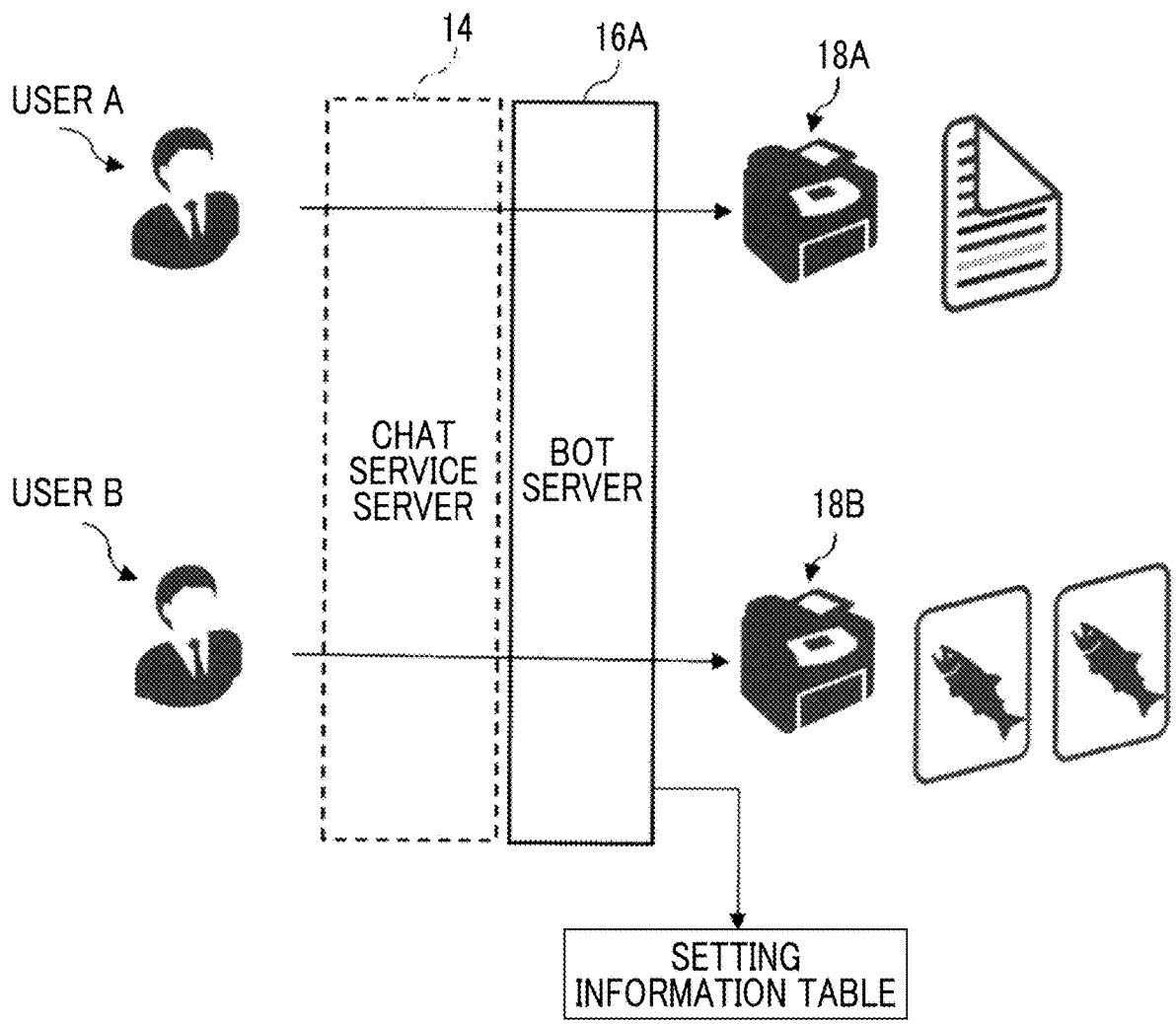
FIG. 4 is diagram (part 1) illustrating setting information registration in the first exemplary embodiment.
FIG. 5 is a diagram illustrating a setting information table.

FIG. 4 schematically illustrates setting information registration processing by the user A and the user B.

In a case where the user A and the user B perform a specific operation ("friend registration") for acquiring a use authority of a chatbot to which a specific account is assigned on the chat service, the bot server A (16A) assigns user identifiers (user IDs) to the user A and the user B, and assigns printer identifiers (printer ID) for uniquely specifying the printer A and the printer B, to the printer A and the printer B. As the user IDs, accounts themselves of the user A and the user B on the chat service may be employed.

The user A transmits a message to the bot server A (16A) via the chat service server 14, and registers setting information in a state where the printer A or the printer B is specified. For example, the user A transmits a message of designating color as the color mode, A4 as the paper size, and one as the number of sheets, as the setting information in a state where the printer A is specified. In a case where the bot server A receives the message, the bot server A analyzes the contents of the message. In a case where the bot server A analyzes the contents thereof to be setting information, the bot server A registers the setting information in the setting information table in a state where the user A and the printer A are associated with each other.

The above descriptions are similarly applied for the user B. The user B transmits a message to the bot server A (16A) via the chat service server 14, and registers setting information in a state where the printer A or the printer B is specified. For example, the user B transmits a message of designating black and white as the color mode, letter as the paper size, and two as the number of sheets, as the setting information in a state where the printer B is specified. In a case where the bot server A receives the message, the bot server A analyzes the contents of the message. In a case where the bot server A analyzes the contents thereof to be setting information, the bot server A registers the setting information in the setting information table in a state where the user B and the printer B are associated with each other.

FIG. 5 illustrates an example of the setting information table stored in the setting information storage unit 166. A printer, the color (color mode), the size (paper size), the number of copies (number of sheets) are recorded for each user in association with each other. More specifically, identification information of the printer, the color (color mode), the size (paper size), and the number of copies (number of sheets) are recorded for each piece of identification information of a user in association with each other.

Figure 6:
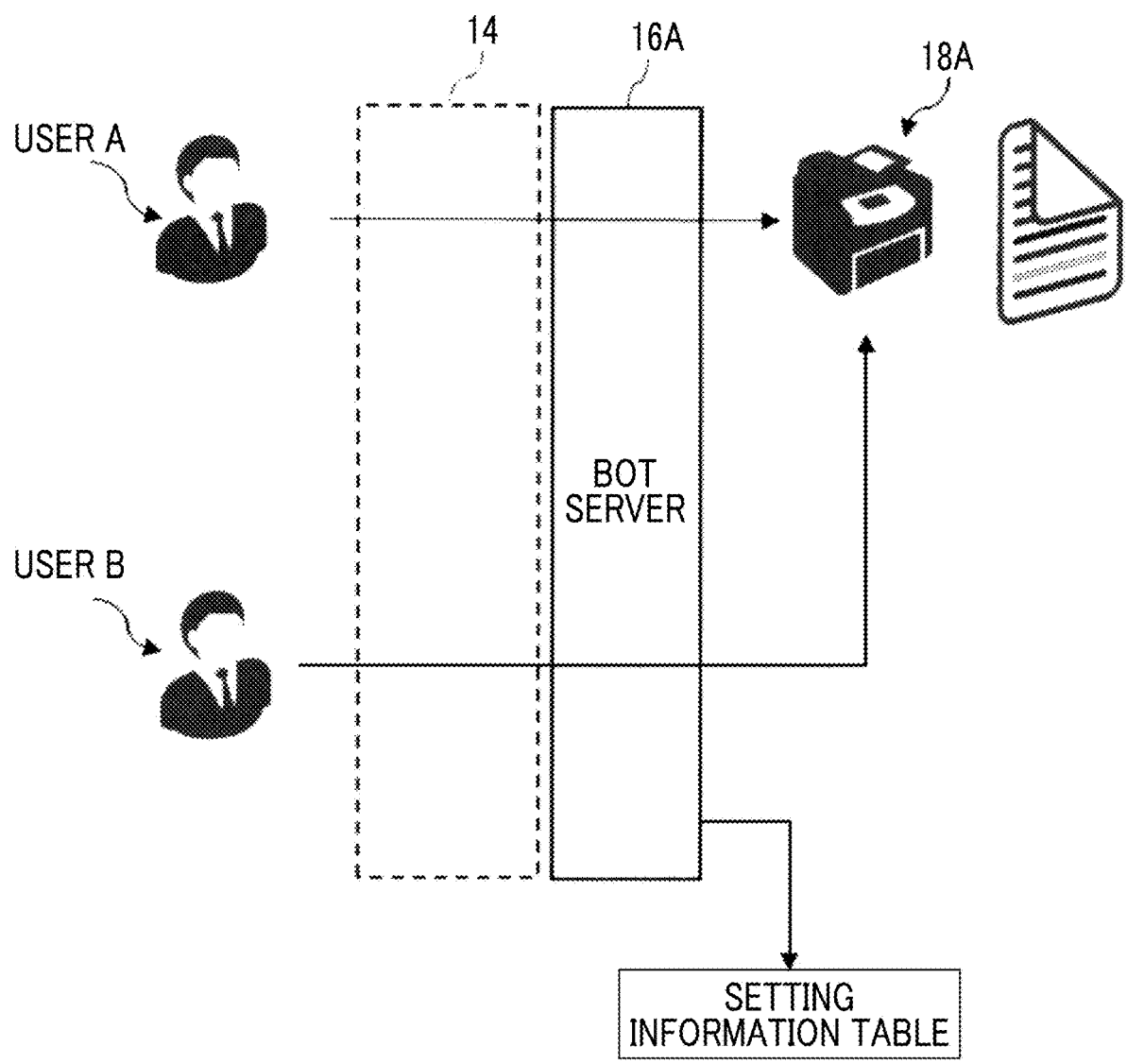
FIG. 6 is diagram (part 2) illustrating the setting information registration in the first exemplary embodiment.

Meanwhile, instead of a case where the user A and the user B register pieces of setting information which are completely different from each other, a user may want to use setting information of another user which has been already registered in the bot server A, in many cases. For example, as illustrated in FIG. 6, the user A may register setting information, and then the user B may want to perform printing in the printer A by using the setting information itself of the user A. Even in such a case, in a case where the user B registers setting information all over again, the procedure becomes cumbersome, and thus the convenience of the chatbot may decrease. In particular, in a case where items of setting information are diverse, the labor of the user increases, and this is inconvenient.

Figure 7:
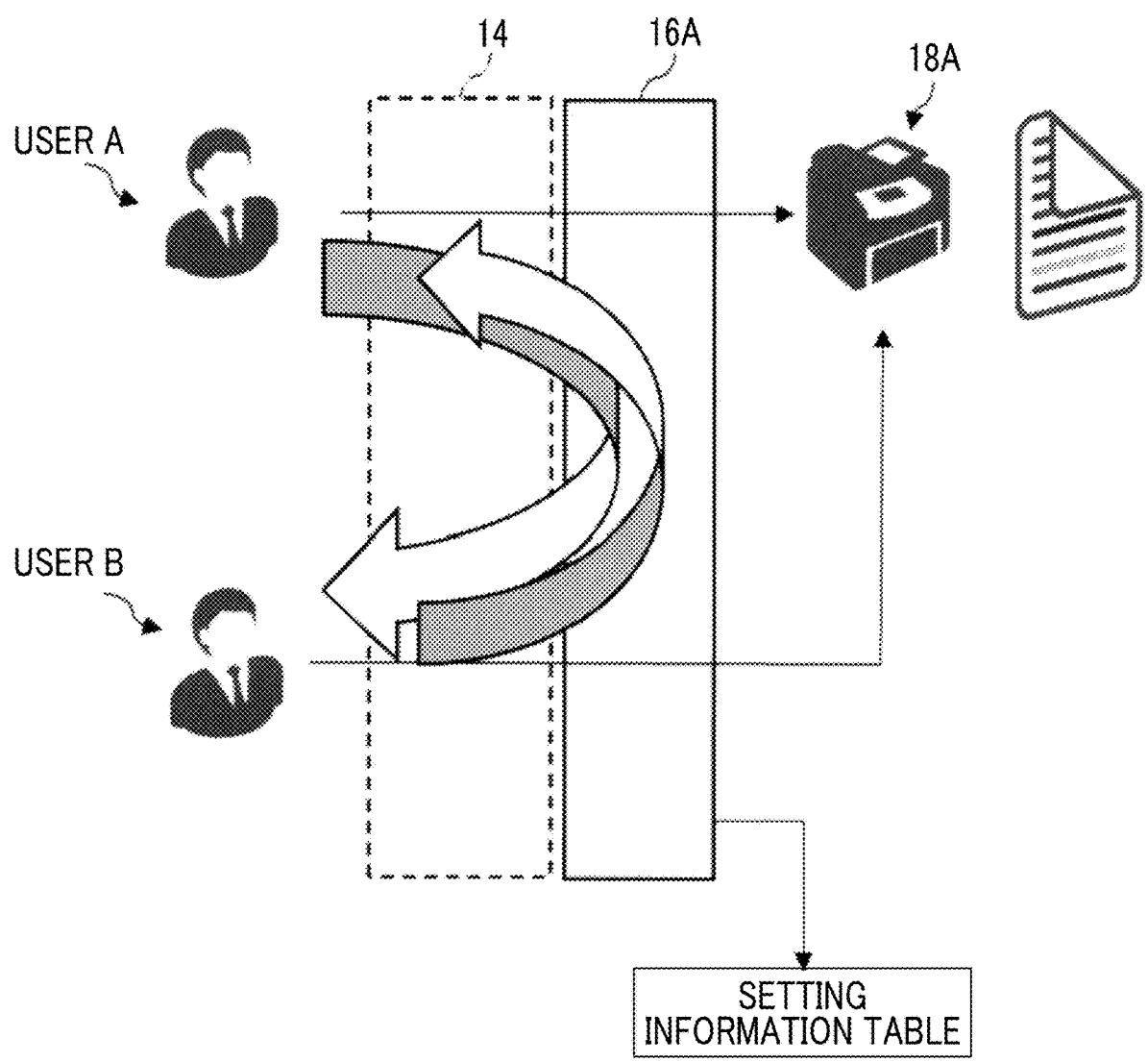
FIG. 7 is diagram (part 3) illustrating the setting information registration in the first exemplary embodiment.

In the exemplary embodiment, as illustrated in FIG. 7, in a case where the user A as a first user has registered setting information, and then the user B as a second user wants to execute a print service by using the setting information of the user A, the registration procedure of the user B can be simplified in a manner that at least a portion of the setting information registered by the user A is registered as setting information of the user B in the setting information table through the transmission and reception of messages between the user A and the user B.

A case where the user B uses the setting information registered by the user A will be described below as an example. The premise of this processing is that the user A operates the user terminal A to transmit a message to a chatbot, and the chatbot receives the message and registers the contents of the received message as setting information in the setting information table. For example, the printer is set to the printer A, the color mode is set to be color, the paper size is set to be A4, and the number of sheets is set to 1.

Figure 8:
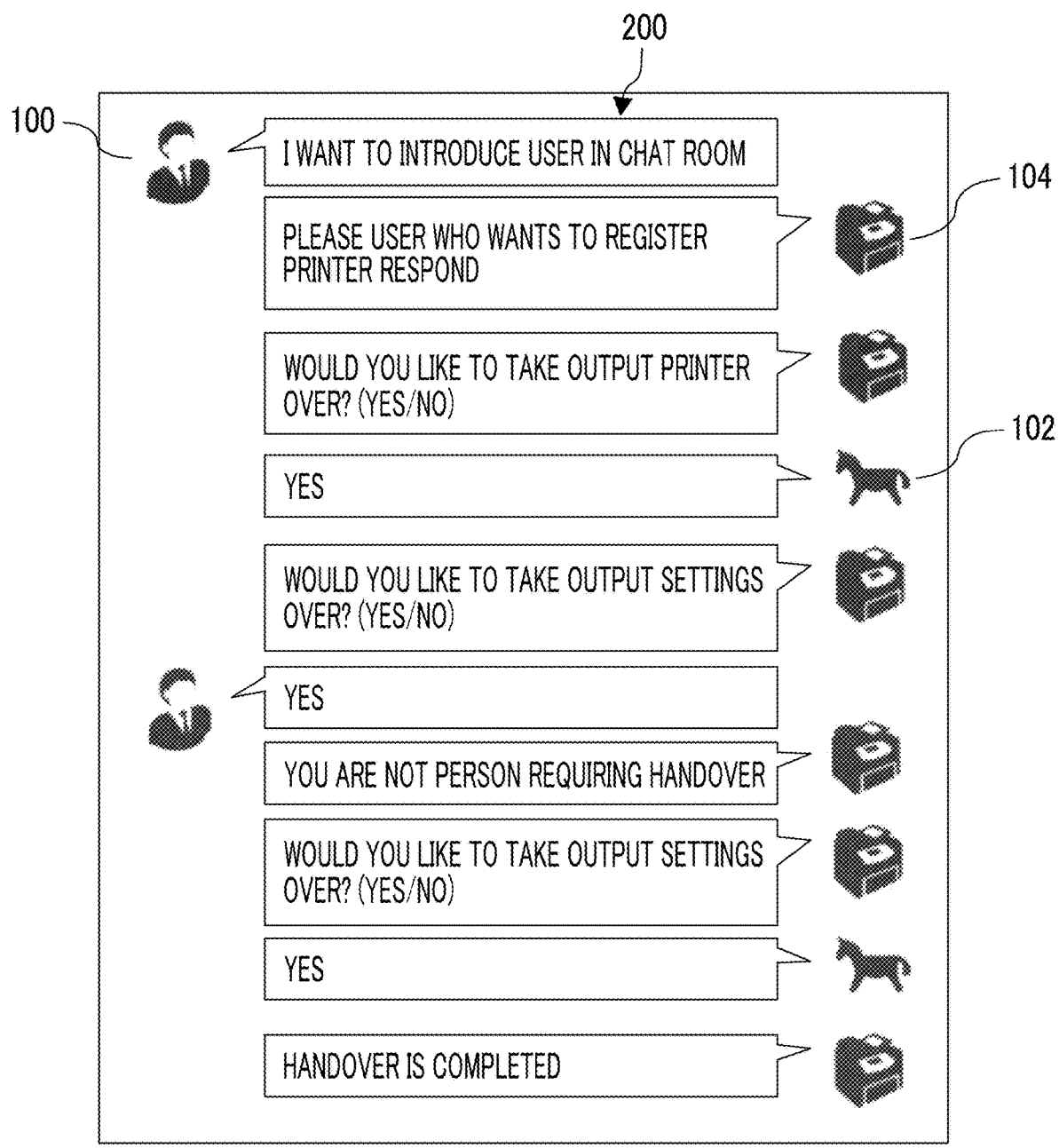
FIG. 8 is a diagram illustrating a display of a screen of a user terminal in the first exemplary embodiment.

FIG. 8 illustrates an example of a screen displayed in the user terminal A (10A) operated by the user A. It is assumed that the user A and the user B are participating in the same group chat, and the user A and the user B are capable of using the chatbot together ("friend registration" has been performed).

A representation figure (icon) 100 indicating the user A and an icon 102 indicating the user B are displayed by the chat service server 14, and an icon 104 indicating the chatbot realized by the bot server A is displayed, on a screen of the user terminal A. Messages 200 from the user A, the user B, and the chatbot are displayed in time series from the top to the bottom.

In FIG. 8, firstly, the user A transmits a message of "wanting to introduce a user in the chat room" to the chatbot.

The chatbot receiving the message analyzes the contents of the message. In a case where the chatbot extracts a keyword of "introduction" and the like, the chatbot transitions to an introduction mode. Then, the chatbot extracts a user ID included in the message, that is, a user ID of the user A as an introducer, and stores the user ID in a memory such as a RAM. The response message creation unit 164 creates a response message and automatically transmits a message of "please a user who wants to register the printer respond" and a message of "would you like to take the output printer over? (yes/no)", as the response.

Then, the user B who has visually recognized the message transmits a message of "yes".

The chatbot receiving the message extracts a user ID included in the message, that is, a user ID of the user B as a person to be introduced, and stores the user ID. The chatbot analyzes the contents of the message. In a case where the contents are positive, that is, "yes", the chatbot associates the user ID of the user B with the printer ID of the printer A associated with the user ID of the user A as the introducer. The response message creation unit 164 creates a response message, and automatically transmits a message of "would you like to take the output settings over? (yes/no)" as a response. In a case where the user B transmits a message of "no" instead of "yes", the chatbot does not perform association and skips the subsequent processing, because the contents of the message are negative.

Then, it is assumed that the user A who has visually recognized the message transmits a message of "yes".

The chatbot receiving the message extracts the user ID included in the message, that is, the user ID of the user A as the introducer. Because the extracted user ID is different from the user ID of the user B as a person who is to be introduced and requires handover of setting registration, the chatbot automatically transmits a message of "you are not a person requiring handover", and a message of "would you like to take the output settings over? (yes/no)?", as a response.

It is assumed that the user B who has visually recognized the message transmits a message of "yes".

The chatbot receiving the message extracts the user ID included in the message, that is, the user ID of the user B as the person to be introduced. Because the extracted user ID is the same as the user ID of the user B as the person who is to be introduced and requires handover of setting registration, the chatbot analyzes the contents of the message. In a case where the contents are positive, that is, "yes", the chatbot associates the user ID of the user B with setting information associated with the user ID of the user A as the introducer. That is, the chatbot copies the setting information of the user A and pastes the setting information as setting information of the user B. Then, the chatbot automatically transmits a message of "handover is completed" as a response.

In FIG. 8, the chatbot automatically transmits the message of "would you like to take the output printer over? (yes/no)" and the message of "would you like to take the output settings over? (yes/no)" as the response. In addition to the above messages, the chatbot may automatically transmit a message of "would you like to take over the setting information of the user A? (yes/no)" as the response.

A processing algorithm of the chatbot realized by the bot server A will be described in detail, as follows.

Step 1: The bot server receives friend registration from the user A and the user B and stores the user IDs of the user A and the user B in the user information storage unit 165.

Step 2: The bot server receives a message regarding setting information from the user A. The bot server analyzes the contents of the message, associates the setting information with the user ID of the user A, and then registers the resultant of the association as setting information of the user A, in the setting information table. The setting information table is stored in the setting information storage unit 166.

Step 3: The bot server receives an introduction message from the user A and analyzes the contents of the message. Thus, the bot server transitions to the introduction mode. The bot server creates a message of urging a response from the person to be introduced, and automatically transmits the created message as a response. After automatically transmitting the response, the bot server transitions to a state of waiting for a response from the person to be introduced.

Step 4: The bot server receives a message from the user and checks whether or not the user ID of the message is a user ID of a user other than the user A. In a case where the user ID of the received message is the user ID of the user (user B) other than the user A, the bot server determines that the message is a response from the person to be introduced. Thus, the bot server creates a message of urging a response to whether or not to use setting information, and automatically transmits the created message as a response. After automatically transmitting the response, the bot server transitions to a state of waiting for a response from the person to be introduced.

Step 5: The bot server receives a message from the user. In a case where the user ID of the received message is the user ID of the user B, the bot server determines that the message is a response from the person to be introduced. The bot server analyzes the contents of the message and determines whether the contents thereof are positive (yes) or negative (no). In a case where the response is positive, the bot servers copies the setting information of the user A as setting information of the user B. The bot server creates a message indicating registration of the setting information of the user B is completed, and automatically transmits the created message as a response. In a case where the response is negative, the bot server maintains the setting information of the user B to have a default value for the user B. In a case where the user ID of the message is different from the user ID of the user B, the bot server creates a message indicating that the user is not the user who is required to respond, and automatically transmits the created message as a response.

Figures 9, 10:
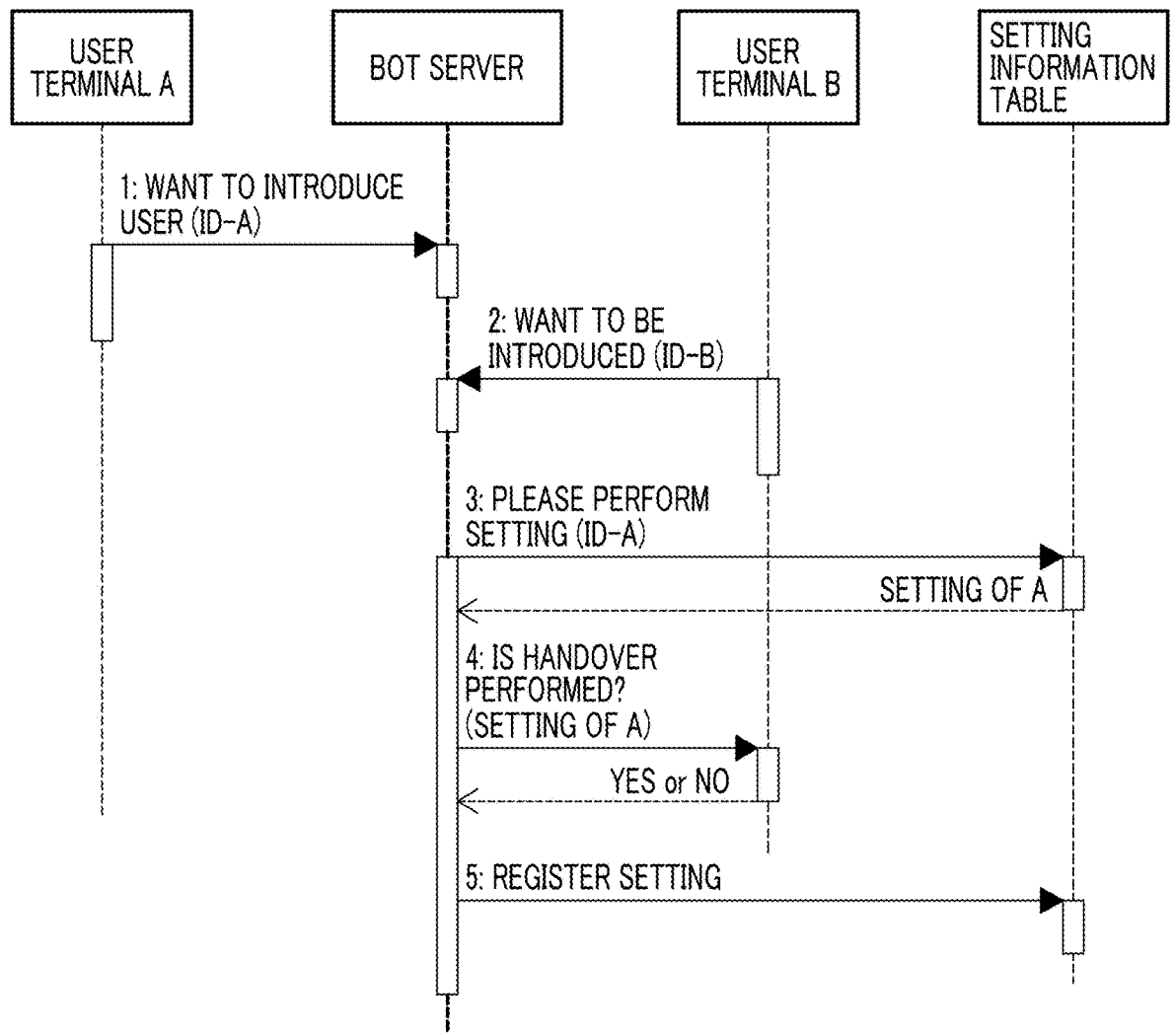
FIG. 9 is a diagram illustrating an update of the setting information table in the first exemplary embodiment.
FIG. 10 is a sequence chart of the first exemplary embodiment.

FIG. 9 illustrates the setting information table after the setting information of the user A is handed over by the user B. The setting information of the user A indicates that the color mode is set as the color, the paper size is set as A4, and the number of sheets is set to 1. The setting information of the user B also indicates that the color mode is set as the color, the paper size is set as A4, and the number of sheets is set to 1, that is, the setting information of the user B is the same as the setting information of the user A. In FIG. 9, arrows indicate that the items of the setting information, that is, the printer, the color mode, the paper size, and the number of sheets are copied from the user A to the user B.

In FIG. 8, the registration of the setting information may be completed only in a manner that the user A transmits a message of "wanting to introduce a user in the chat room", and the user B transmits a message of "yes" in a response to the response message from the chatbot. That is, the user B may use the setting information of the user A only in a manner that the user A as the introducer transmits a message indicating an introduction, and the user B as the person to be introduced transmits a message indicating using the setting information.

FIG. 10 is a sequence chart of the exemplary embodiment. FIG. 10 illustrates processing between the user terminal A operated by the user A, the user terminal B operated by the user B, and the bot server 16 realizing the chatbot.

The user A operates the user terminal A to transmit a message indicating that the user A wants to introduce another user, to the bot server 16.

The bot server 16 extracts and stores a user ID (user ID of the user A) included in the message. The bot server automatically responds to the message. For example, the bot server transmits the messages of "please a user who wants to register the printer respond" and "would you like to take the output printer over?".

Regarding this, the user B as the person to be introduced operates the user terminal B to transmit a message indicating that the user B wants to be introduced, to the bot server 16.

The bot server 16 extracts a user ID (user ID of the user B) included in the message, and records the printer ID associated with the user ID of the user A in the setting information table in association with the extracted user ID. The bot server automatically responds to the message. For example, the bot server 16 transmits the message of "would you like to take the output settings over?".

Regarding this, the user B operates the user terminal B to transmit a message of "yes" or "no" to the bot server 16.

In a case where the contents of the message specified by the user ID of the user B are positive, the bot server 16 registers setting information itself which has been recorded in association with the user ID of the user A, as setting information of the user B.

Second Exemplary Embodiment

In the first exemplary embodiment, the user A and the user B are participating in the same group chat, both of the user A and the user B have use authorities for the chatbot (friend registration has been performed), and the user A, the user B, and the chatbot are in the same group chat. However, using the setting information is possible even in a case where the user A and the user B are not participating in the same group chat. Next, this case will be described. The user A has a use authority for the chatbot (friend registration), but it is not necessary that the user B has a use authority for the chatbot in advance.

Figure 11A:
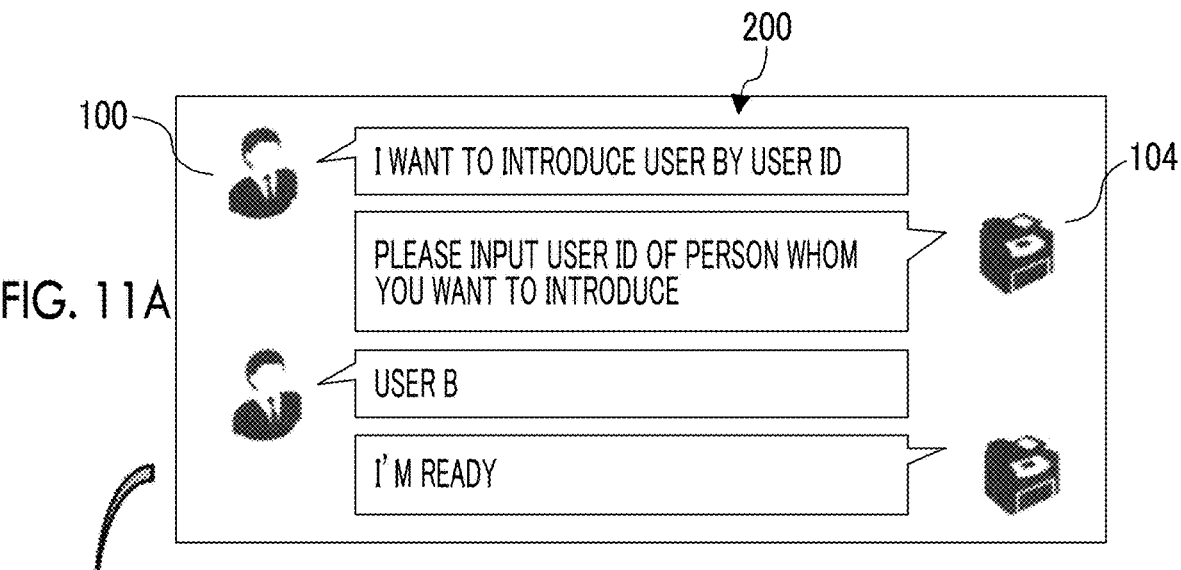
FIGS. 11A and 11B are diagrams illustrating a display of a screen of a user terminal in a second exemplary embodiment.
Figure 11B:
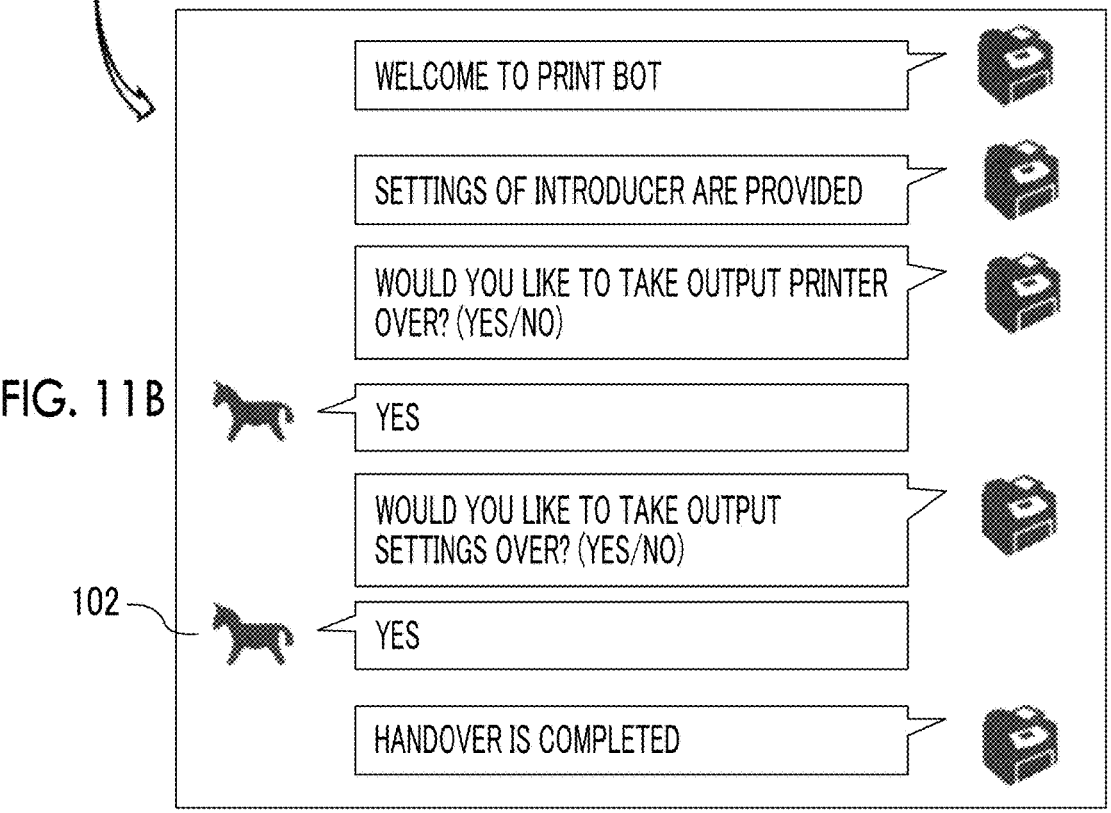

FIGS. 11A and 11B illustrate a screen example displayed in the user terminal A and a screen example displayed in the user terminal B, in a case where the user A and the user B do not exist in the same group chat (or the same chat room).

FIG. 11A illustrates the screen example displayed in the user terminal A. The user A transmits a message of "wanting to introduce a user by a user ID".

The chatbot receiving the message analyzes the contents of the message and extracts keywords such as "user ID" and "wanting to introduce a user". The chatbot transitions to a pre-registration mode and automatically transmits a message of "please input a user ID of a person whom you want to introduce", as a response.

The user A who has visually recognizes the message as the introducer transmits a message of "user B" as the person to be introduced, to the chatbot.

The chatbot receiving the message extracts a user ID (user ID of the user B) included in the message. The chatbot creates a new entry in which the user ID of the user B is set as the user, in the setting information table. The chatbot copies and pastes setting information associated with the user ID of the user A, in the entry. The confirmation flag of the entry, that is, the entry of the user B is set to be X (not confirmed). Information indicating a user having setting information which has been copied as described above (in this case, the user A) may be added. The chatbot automatically transmits a message of "I'm ready" as a response. In this state, the setting information of the user B is set to be the same as the setting information of the user A, and is provisionally registered.

Then, the user A informs the user B to providing the chatbot by a mail or the like, or the user B individually searches for the chatbot. Thus, the user B is in a state of having a use authority of the chatbot (friend registration has been performed).

FIG. 11B illustrates the screen example displayed in the user terminal B. The chatbot responds to completion of friend registration. The response message creation unit 164 creates a response message and automatically transmits a message of "welcome to the print bot" as a response. The chatbot checks whether or not the entry of the user B is in the setting information table. In a case where the entry of the user B is in the setting information table, and the confirmation flag is set to be X (not confirmed), the chatbot automatically transmits a message of "settings of the introducer are provided" and "would you like to take the output printer over? (yes/no)", as a response.

The user B who has visually recognized the message transmits a message of "yes".

The chatbot receiving the message automatically transmits a message of "would you like to take the output settings over? (yes/no)" as a response.

In a case where the user B transmits the message of "yes", the chatbot receiving the message changes the confirmation flag of the entry of the user B from X to O (confirmed), and registers (main registration) the entry. Then, the chatbot automatically transmits a message of "handover is completed" as a response.

In a case where the user B transmits a message of "no", the chatbot sets the setting information of the user B, which has been provisionally registered, to be invalid by overwriting the setting information of the user B with the default value. The default value may be null data.

A processing algorithm of the chatbot realized by the bot server A will be described in detail, as follows.

Step 1: The bot server receives friend registration from the user A and stores the user ID of the user A in the user information storage unit 165.

Step 2: The bot server receives a message regarding setting information from the user A. The bot server analyzes the contents of the message, associates the setting information with the user ID of the user A, and then registers the resultant of the association as setting information of the user A, in the setting information table. The setting information table is stored in the setting information storage unit 166.

Step 3: The bot server receives an introduction message from the user A and analyzes the contents of the message. Thus, the bot server transitions to the pre-registration mode. The bot server creates a message of urging specifying of a person to be introduced, and automatically transmits the created message as a response. After automatically transmitting the response, the bot server transitions to a state of waiting for a response from the introducer.

Step 4: The bot server receives a message from the user A and determines that the user ID (user ID of the user B) included in the message indicates the person to be introduced. The bot server creates a new entry in which the user ID of the user B is set as the user, in the setting information table. The bot server copies and pastes setting information associated with the user ID of the user A, in the entry. The confirmation flag of the entry of the user B is set to be X (not confirmed). Then, the bot server creates a message indicating that the bot server is ready and automatically transmits the message as a response.

Step 5: The bot server receives friend registration from the user B and stores the user ID of the user B in the user information storage unit 165. The bot server determines whether or not setting information associated with the user ID of the user B is provided and determines the value of the confirmation flag, with reference to the setting information table. In a case where the setting information associated with the user ID of the user B is provided and the confirmation flag is set to be X, the bot server creates a message which indicates settings of the introducer are provided, and is for urging a response to whether or not to use the setting information. The bot server automatically transmits the message as a response. In a case where the setting information associated with the user ID of the user B is not provided (including the default value), or in a case where the confirmation flag is already set to be 0, the bot server does not automatically transmit the message of urging the response.

Step 6: The bot server receives a message from the user B. The bot server analyzes the contents of the response and determines whether the response is positive (yes) or negative (no). In a case where the response is positive, the bot server updates the confirmation flag of the setting information of the user B to O, and performs main registration of the setting information. The bot server creates a message indicating registration of the setting information of the user B is completed, and automatically transmits the created message as a response. In a case where the response is negative, the bot server brings the setting information of the user B back to the default value.

Figures 12A, 12B:
FIGS. 12A and 12B are diagrams illustrating an update of a setting information table in the second exemplary embodiment.

FIGS. 12A and 12B schematically illustrate the setting information table.

Firstly, as illustrated in FIG. 12A, an entry is created in association with the user ID (included in the message of the user A as the introducer) of the user B as the person to be introduced. The bot server copies the setting information of the user A as the introducer to the entry of the user B and sets the confirmation flag to be X (not confirmed).

Then, as illustrated in FIG. 12B, the bot server confirms registration by changing the confirmation flag of the user B from X to O (confirmed) in response to the positive message from the user B as the person to be introduced.

The registration of the setting information may be completed only in a manner that the user A transmits a message which indicates an introduction and is for specifying a person to be introduced, and the user B transmits a positive message indicating using the setting information.

FIG. 13 is a sequence chart of the exemplary embodiment.

The user terminal A transmits a message indicating that the user A wants to introduce another user, to the bot server 16. The bot server 16 automatically transmits a message of asking for a person to be introduced, in response to the message. In a case where the user terminal A transmits a message of specifying the person to be introduced, the bot server 16 creates a new entry in which the user ID of the person to be introduced, which is included in the message is set as a new user, in the setting information table.

Then, in a case where the user terminal B performs an operation of causing the bot server 16 to perform registration (friend registration), the bot server 16 checks whether or not the entry of the user B is provided, with reference to the setting information table. In a case where the entry of the user B is provided, and the confirmation flag is set to be X (not confirmed), the bot server 16 automatically transmits a message of checking whether or not handover is performed, to the user terminal B as a response. In a case where the user terminal B transmits a positive message, the bot server 16 updates the confirmation flag of the user B to O (confirmed) and registers the setting information.

Third Exemplary Embodiment

In FIGS. 11A and 11B, the user A as the introducer transmits the user ID of the user B as the person to be introduced, in a form of a message. However, instead of the user ID, the user A as the introducer may transmit a contact information of the user B in a form of a message.

FIGS. 14A and 14B illustrate a screen example displayed in the user terminal A and a screen example displayed in the user terminal B, in this case.

FIG. 14A illustrates the screen example displayed in the user terminal A. The user A transmits an object indicating contact information of the user B along with a message of "user B".

The chatbot receiving the message creates a new entry of the user, which is specified by the contact information object of the user B, which is included in the message, in the setting information table. The chatbot copies and pastes setting information associated with the user ID of the user A, in the entry. The confirmation flag of the entry, that is, the entry of the user B is set to be X (not confirmed). The chatbot automatically transmits a message of "I'm ready" as a response.

Then, the user A informs the user B to providing the chatbot by a mail or the like, or the user B individually searches for the chatbot. Thus, the user B comes to be capable of using the chatbot (friend registration has been performed).

FIG. 14B illustrates the screen example displayed in the user terminal B. The chatbot responds to completion of friend registration. The chatbot automatically transmits messages of "welcome to the print bot", "you are introduced by the user A", and "would you like to take the output printer over? (yes/no)", as a response.

The user B who has visually recognized the message transmits a message of "yes".

The chatbot receiving the message automatically transmits a message of "would you like to take the output settings over? (yes/no)" as a response.

In a case where the user B transmits the message of "yes", the chatbot receiving the message changes the confirmation flag of the entry of the user B from X to O (confirmed), and registers the entry. Then, the chatbot automatically transmits a message of "handover is completed" as a response.

In a case where the user B transmits a message of "no", the chatbot sets the setting information of the user A to be invalid by overwriting the setting information of the user B with the default information.

Fourth Exemplary Embodiment

Not the user A as the introducer transmits the user ID or the contact information of the user B as the person to be introduced in a form of a message, but the user A may provide another kind of information, for example, the setting information of the user A for the user B in a format of an URL.

Figure 15A:
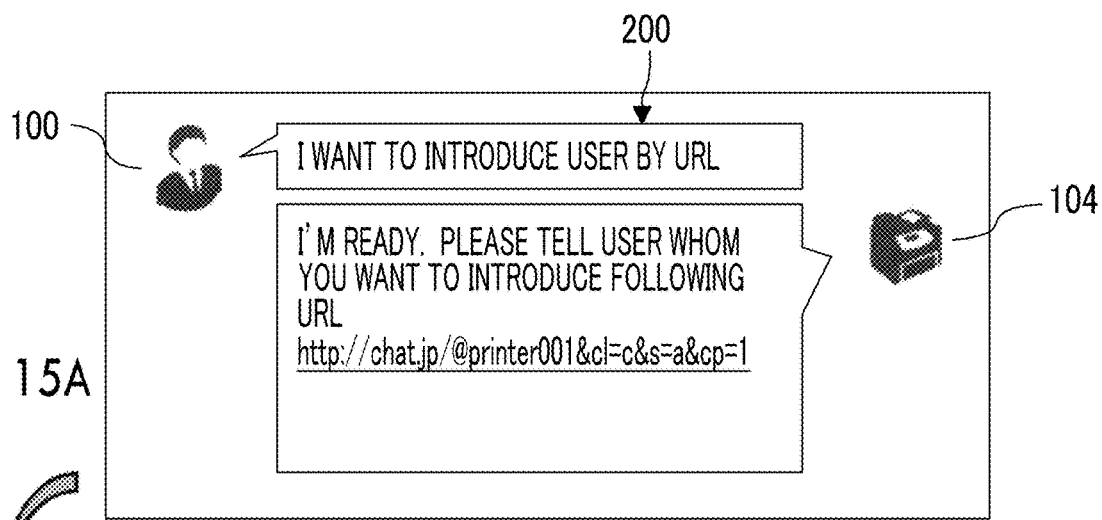
FIGS. 15A and 15B are diagrams illustrating a display of a screen of a user terminal in a fourth exemplary embodiment.

FIG. 15A illustrates a screen example displayed in the user terminal A. The user A transmits a message of "wanting to introduce a user by an URL".

The chatbot receiving the message extracts the user ID of the user A, which is included in the message. The chatbot reads setting information associated with the user ID from the setting information table, and then embeds the setting information in an URL. For example, the chatbot generates an URL of http://chat.jp/@printer=001&cl=c&s=a&cp=1, as the URL. Here, the phrase of printer=001 indicates that the printer is a specific printer having the number of "001". The phrase of Cl=c indicates that the color mode is set to be color. The phrase of s=a indicates that the paper size is set to A4. The phrase of cp=1 indicates that the number of sheets is set to 1. This is just an example, and the setting information may be embedded in any format. The chatbot automatically transmits a message of "I'm ready. Please tell a user whom you want to introduce the following URL" as a response, and includes the generated URL in the message.

Then, the user A informs the user B of the URL by a mail or the like. The user B accesses the chatbot by using the provided URL, and thus is capable of using the chatbot (friend registration is performed).

Figure 15B:
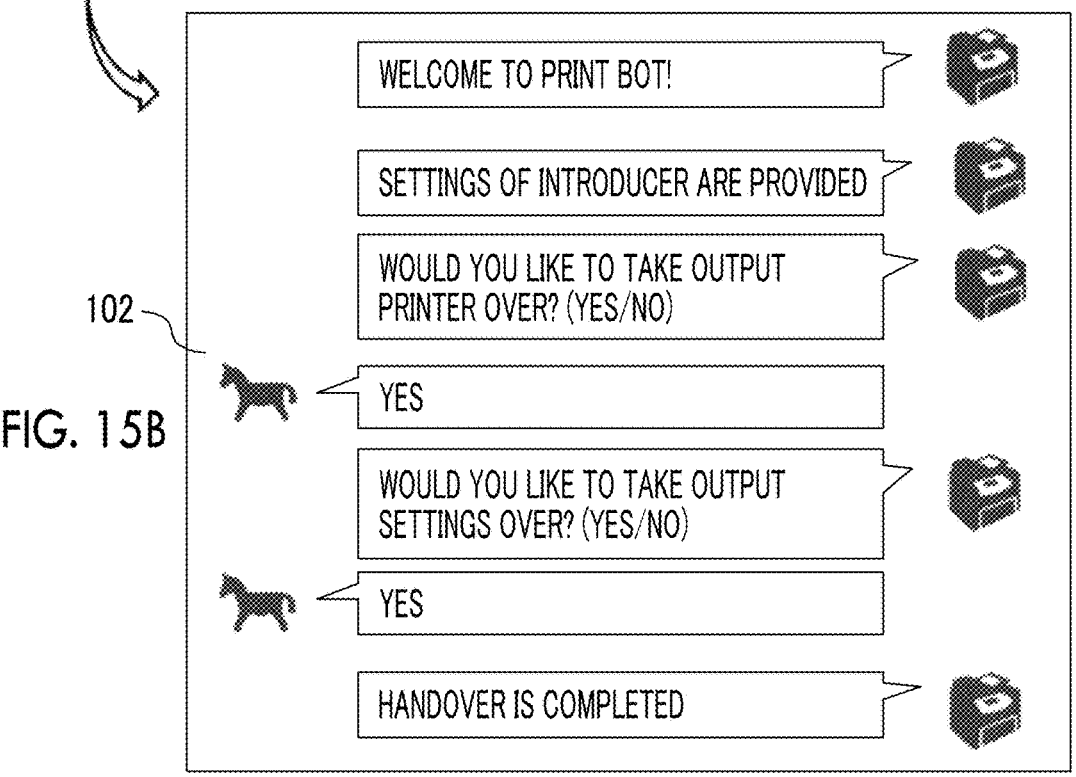

FIG. 15B illustrates the screen example displayed in the user terminal B. The chatbot responds to completion of friend registration. The chatbot automatically transmits messages of "welcome to the print bot", "settings of the introducer are provided", and "would you like to take the output printer over? (yes/no)", as a response.

The user B who has visually recognized the message transmits a message of "yes".

The chatbot receiving the message automatically transmits a message of "would you like to take the output settings over? (yes/no)" as a response.

In a case where the user B transmits the message of "yes", the chatbot receiving the message restores the setting information of the user A, which has been embedded in the URL, from the URL. The chatbot registers the setting information of the user A in association with the user ID of the user B in the setting information table, as setting information of the user B. Then, the chatbot automatically transmits a message of "handover is completed" as a response.

In a case where the user B transmits a message of "no", the chatbot does not restore the setting information from the URL.

Figure 16A:
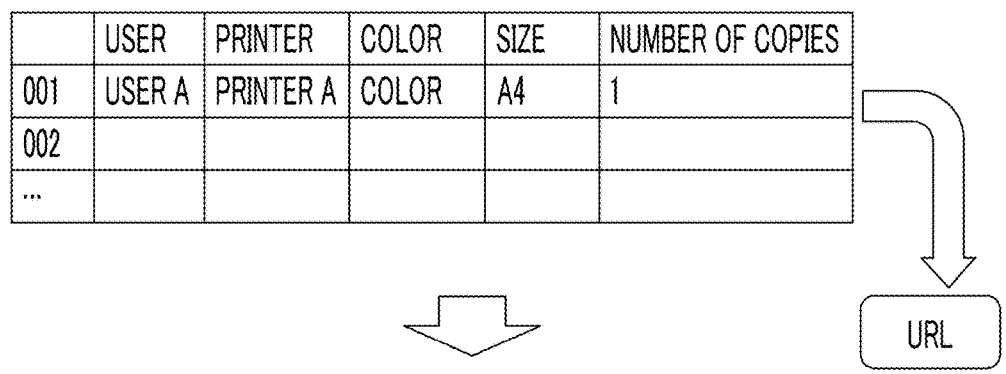
FIGS. 16A and 16B are diagrams illustrating an update of a setting information table in the fourth exemplary embodiment.
Figure 16B:
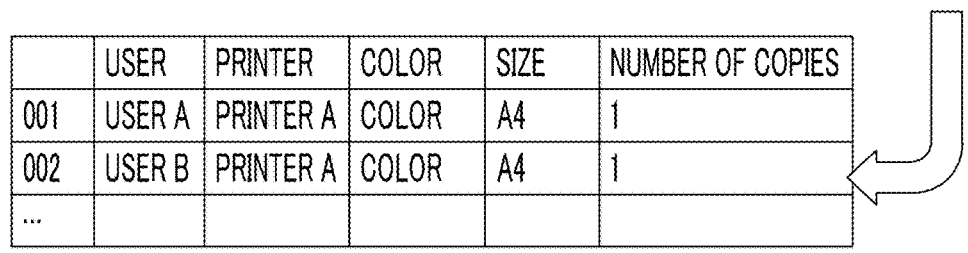

FIGS. 16A and 16B schematically illustrate the setting information table.

Firstly, as illustrated in FIG. 16A, an URL including setting information associated with the user ID of the user A, which is included in the message of the user A as the introducer is generated. The URL is provided for the user B as the person to be introduced.

Then, as illustrated in FIG. 16B, the user B as the person to be introduced accesses the chatbot by using the URL. Thus, the setting information of the user A is restored from the URL and is registered as the setting information of the user B.

The registration of the setting information may be completed only in a manner that the user A transmits a message indicating that the user A wants to perform introduction by an URL, and the user B transmits a message of using the setting information by using the URL.

Fifth Exemplary Embodiment

In the above exemplary embodiments, the user B as the person to be introduced uses the setting information of the user A by the introduction from the user A as the introducer. However, conversely, a message from the user B who wants to use the setting information may be transmitted at first, and then the setting information of the user A may be set to be capable of being used, in response to the message.

FIGS. 17A to 17C illustrate processing in this case.

FIG. 17A illustrates a screen example displayed in the user terminal B. The user B transmits a message of "I want to take over settings of the existing user".

The chatbot receiving the message extracts keywords such as "existing user", "setting", and "wanting to takeover". The chatbot transitions to a be-introduced mode and automatically transmits a message of "please let me know the user name", as a response. Here, "the introduction mode" is a mode in which the introducer introduces another user. "The be-introduced mode" is a mode in which the person to be introduced designates another user as the introducer.

The user B who has visually recognized the message transmits a message of "user A" in order to designate the introducer.

The chatbot receiving the message extracts the user ID of the user A, which is included in the message. The chatbot reads setting information associated with the user ID, with reference to the setting information table, and thus generates an URL in which the setting information is embedded. The URL in which the setting information is embedded may have a format described in the fourth exemplary embodiment, for example. A flag indicating that the message of using the setting information is provided from the user B may be added to the entry of the user A.

FIG. 17B illustrates a screen example displayed in the user terminal A. The chatbot automatically transmits a message of "the user B requires handover of the setting values. Do you permit this?", with reference to the flag of the user A in the setting information table, after the chatbot generates the URL by the message from the user B.

The user A who has visually recognized the message transmits a message of "permit".

FIG. 17C illustrates a screen example displayed in the user terminal B again. The chatbot receiving the message of "permit" from the user A automatically transmits a message of "handover of settings from the user A is permitted. Would you like to take over the settings?" as a response.

The user B who has visually recognized the message transmits a message of "yes". The chatbot receiving the message restores the setting information of the user A, which has been embedded in the URL, from the URL. The chatbot registers the setting information of the user A in association with the user ID of the user B in the setting information table, as setting information of the user B. Although not illustrated, the chatbot may automatically transmit a message of "handover is completed". The URL may be generated at a timing after the user A permits the handover. In this case, in a case where the user A rejects the handover, the URL in which the setting information of the user A is embedded is not generated.

A processing algorithm of the chatbot realized by the bot server A will be described in detail, as follows.

Step 1: The bot server receives friend registration from the user A and the user B and stores the user IDs of the user A and the user B in the user information storage unit 165.

Step 2: The bot server receives a message regarding setting information from the user A. The bot server analyzes the contents of the message, associates the setting information with the user ID of the user A, and then registers the resultant of the association as setting information of the user A, in the setting information table. The setting information table is stored in the setting information storage unit 166.

Step 3: The bot server receives a message from the user B, which indicates using the setting information of the existing user. The bot server analyzes the contents of the message. The bot server creates a message of urging specifying of the introducer, and automatically transmits the created message as a response. After automatically transmitting the response, the bot server transitions to a state of waiting for a response from the user B as the person to be introduced.

Step 4: The bot server receives a message from the user B and determines that the user ID (user ID of the user A) included in the message indicates the introducer. The bot server reads the setting information associated with the user ID of the user A with reference to the setting information table. The bot server embeds the setting information which has been read, in specific information, for example, an URL.

Step 5: In a case where the bot server receives any message from the user A, the bot server creates a message which indicates that the user B wants to use the setting information and is for urging a response to whether or not using by the user B is permitted. The bot server automatically transmits the message as a response. After automatically transmitting the response, the bot server transitions to a state of waiting for a response from the user A.

Step 6: The bot server receives a message from the user A. The bot server analyzes the contents of the response and determines whether the response is positive (permitted) or negative (not permitted).

Step 7: In a case where the bot server receives any message from the user B, the bot server creates a message of delivering the contents of the response from the user A and automatically transmits the message as a response. In a case where the response of the user A is positive (permitted), the bot server creates a message of urging a response to whether or not to use the setting information, and automatically transmits the message as a response. In a case where the response from the user A is negative, the bot server creates a message indicating that the response from the user A is negative, and automatically transmits the message as a response.

Step 8: The bot server receives a message from the user B. The bot server analyzes the contents of the response and determines whether the response is positive (yes) or negative (no). In a case where the response is positive, the bot server restores the setting information from the URL and registers the restored setting information as the setting information of the user B. In a case where the response is negative, the bot server maintains the setting information of the user B to have a default value.

The bot server may copy the setting information of the user A and provisionally register the copied setting information as the setting information of the user B, in Step 4. The bot server may perform main registration of the setting information by the response from the user B in Step 8.

Figure 18:
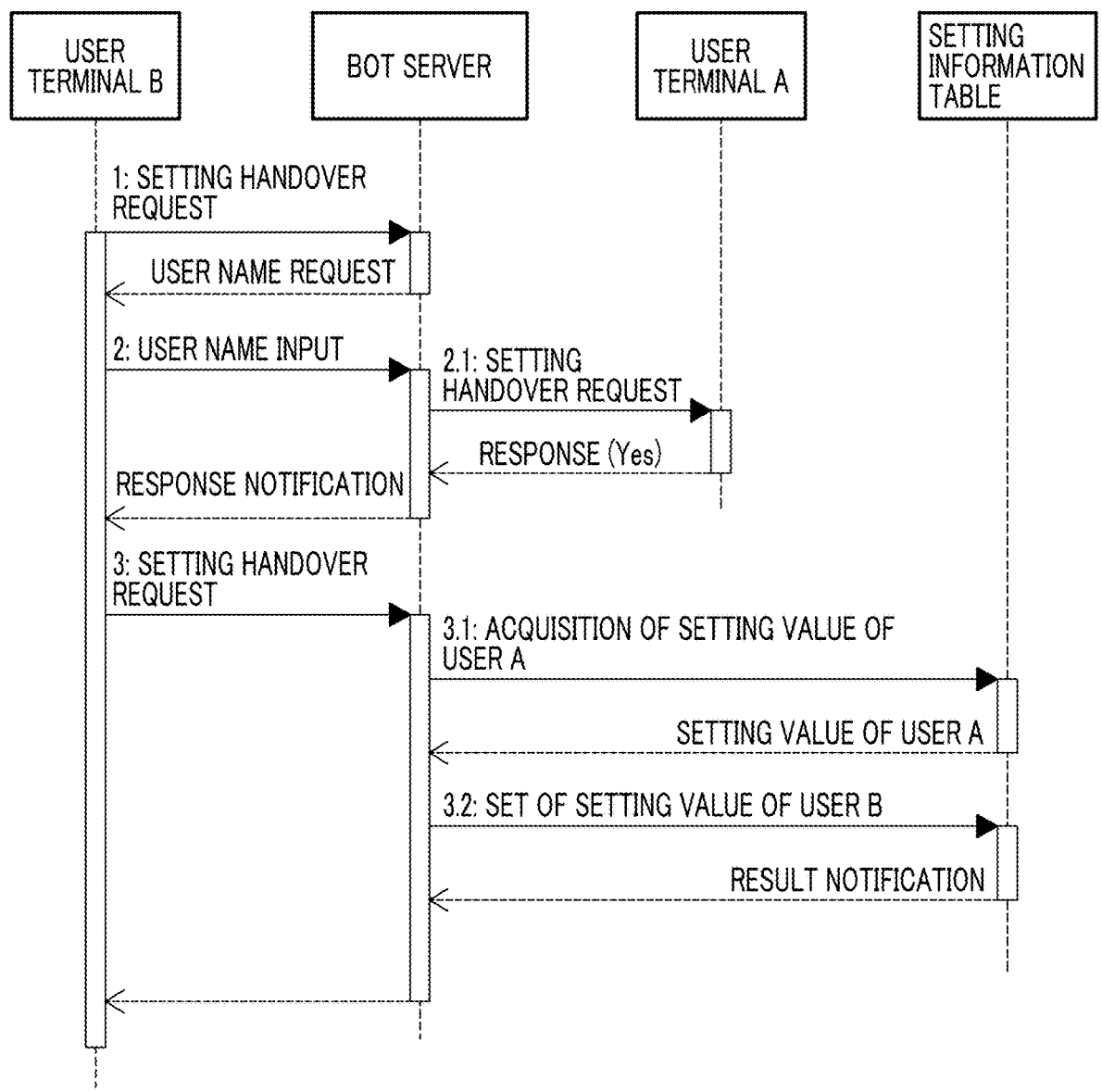
FIG. 18 is a sequence chart of the fifth exemplary embodiment.

FIG. 18 is a sequence chart of the exemplary embodiment. The user terminal B transmits a setting handover request to the bot server 16. The bot server 16 requires a user name from the user terminal B in response to the request. The user terminal B inputs the user name.

The bot server 16 transmits a message indicating the setting handover request has been received, to the user terminal A. The bot server receives a response from the user terminal A and transmits the response to the user terminal B.

The user terminal B transmits the setting handover request to the bot server 16 in response to a response that the handover is permitted. The bot server 16 registers the setting information of the user A as the setting information of the user B, in response to the request.

In a case where the response from the user terminal A indicates that the handover is not permitted, the bot server 16 transmits a message indicating the handover is not permitted to the user terminal B. The bot server rejects the setting handover request from the user B and maintains the setting information of the user B to have the default value.

Sixth Exemplary Embodiment

In the above exemplary embodiments, a case where the user B uses all items of the setting information of the user A is described. However, the user B may use only some items of the setting information of the user A. In this case, the item which may be used by the user B may be selected by the user A or the user B.

Figure 19A:
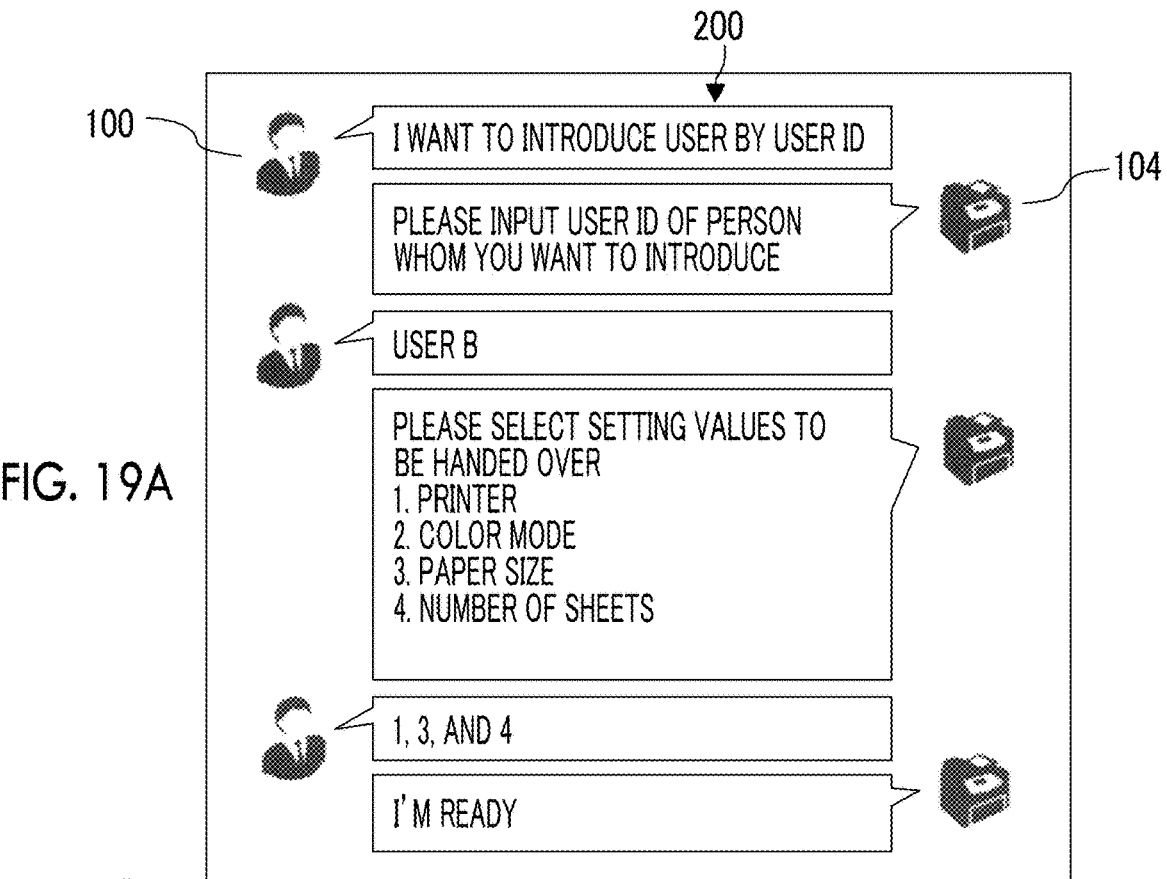
FIGS. 19A and 19B are diagrams illustrating a display of a screen of a user terminal in a sixth exemplary embodiment.
Figure 19B:
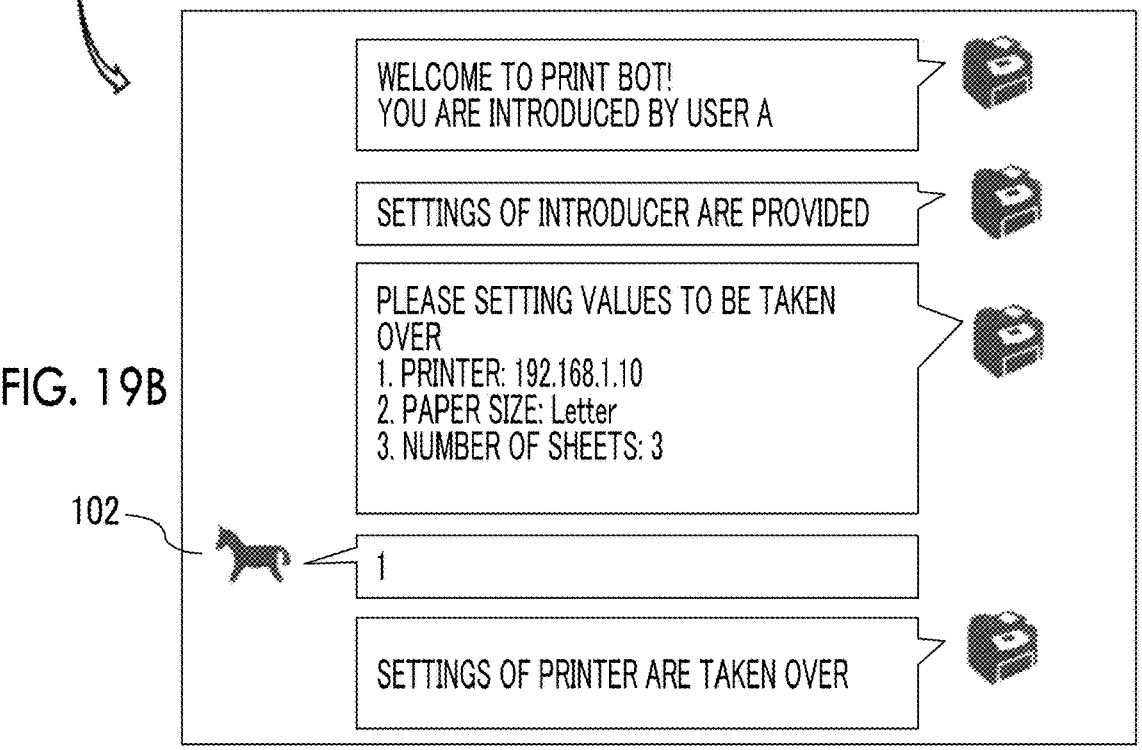

FIGS. 19A and 19B illustrate an example of a case where the user B uses a portion of the setting information of the user A.

FIG. 19A illustrates a screen example displayed in the user terminal A. The user A transmits a message of "wanting to introduce a user by a user ID".

The chatbot receiving the message analyzes the contents of the message. The chatbot transitions to a pre-registration mode and automatically transmits a message of "please input a user ID of a person whom you want to introduce", as a response.

The user B who has visually recognizes the message transmits a message of "user B" to the chatbot.

The chatbot receiving the message extracts a user ID (user ID of the user B) included in the message. The chatbot creates a new entry in which the user ID of the user B is set as the user, in the setting information table. The confirmation flag of the entry, that is, the entry of the user B is set to be X (not confirmed). The chatbot automatically transmits a message as follows as a response.

"Please select the setting values to be handed over.
1. Printer
2. Color mode
3. Paper size
4. Number of sheets".

The items are all items included in the setting information. However, the chatbot may extract only a specific item which may be selected from the items included in the setting information, by the user A, and may automatically transmit a message of the extracted item as a response. For example, the chatbot compares the use authorities of the user A and the user B. Regarding an item for which the user A has a use authority, but the user B does not have a use authority, the chatbot creates a message except for this item. The use authority of the user is stored in the user information storage unit 165, for example.

In a case where the user A wants to use the items of the printer, the paper size, and the number of sheets, the user A which has visually recognized the message transmits a message of "1, 3, and 4".

The chatbot receiving the message copies values of the "1. Printer", "3. Paper size", and "4. Number of sheets" in the entry of the user B in the setting information table, from the setting information of the user A. The chatbot maintains the value of "2. Color mode" which has not been selected, to have the default value. The chatbot automatically transmits a message of "I'm ready" as a response.

Then, the user A informs the user B to providing the chatbot by a mail or the like, or the user B individually searches for the chatbot. Thus, the user B comes to be capable of using the chatbot (friend registration has been performed).

FIG. 19B illustrates the screen example displayed in the user terminal B. The chatbot responds to completion of friend registration. The chatbot automatically transmits messages of "welcome to the print bot" as a response. The chatbot checks whether or not the entry of the user B is provided in the setting information table. In a case where the entry of the user B is provided in the setting information table, and the confirmation flag is set to be X (not confirmed), the chatbot automatically transmits a message of "you are introduced by the user A" and "settings of the introducer are provided" as a response. In addition, the chatbot automatically transmits a message as follows as a response because the items of the setting information, which has been selected by the user A, correspond to 1, 3, and 4, and the confirmation flag is set to be X.

"Please select the setting values to be taken over.
1. Printer: 192.168.1.10
2. Paper size: letter
3. Number of sheets: 3"

The setting information is the setting information of the user B, which has been copied as the setting information of the user A. In a case where the user A transmits a message of "1 and 3", the chatbot automatically transmits a message as follows as a response.

"Please select the setting values to be taken over.
1. Printer: 192.168.1.10
3. Number of sheets: 3"

The user B who has visually recognized the message transmits a message of "1", for example.

The chatbot receiving the message maintains the printer as it is, as the setting information of the user B, and brings the paper size and the number of sheets back to the default values. The chatbot updates the confirmation flag from X to O and automatically transmits a message of "settings of the printer are taken over" as a response.

In a case where the user B transmits a message of "1 and 2" in response to the previous message, the chatbot maintains the printer and the paper size as they are, as the setting information of the user B and brings the number of sheets back to the default value. The chatbot changes the confirmation flag from X to O and automatically transmits a message of "settings of the printer and the paper size are taken over" as a response.

As described above, only a specific item of the setting information may be used in a manner that the user A as the introducer selects items of the setting information, which the user A wants the user B to use, and the user B as the person to be introduced selects an item desired by the user B among the items selected by the user A.

Seventh Exemplary Embodiment

In the above exemplary embodiments, the printer, the color mode, the paper size, and the number of sheets are exemplified as the items of the setting information. In addition to the above items, the setting information may include an item relating to a user authority. The user authority may be handed over from a certain user to another user.

Figure 20A:
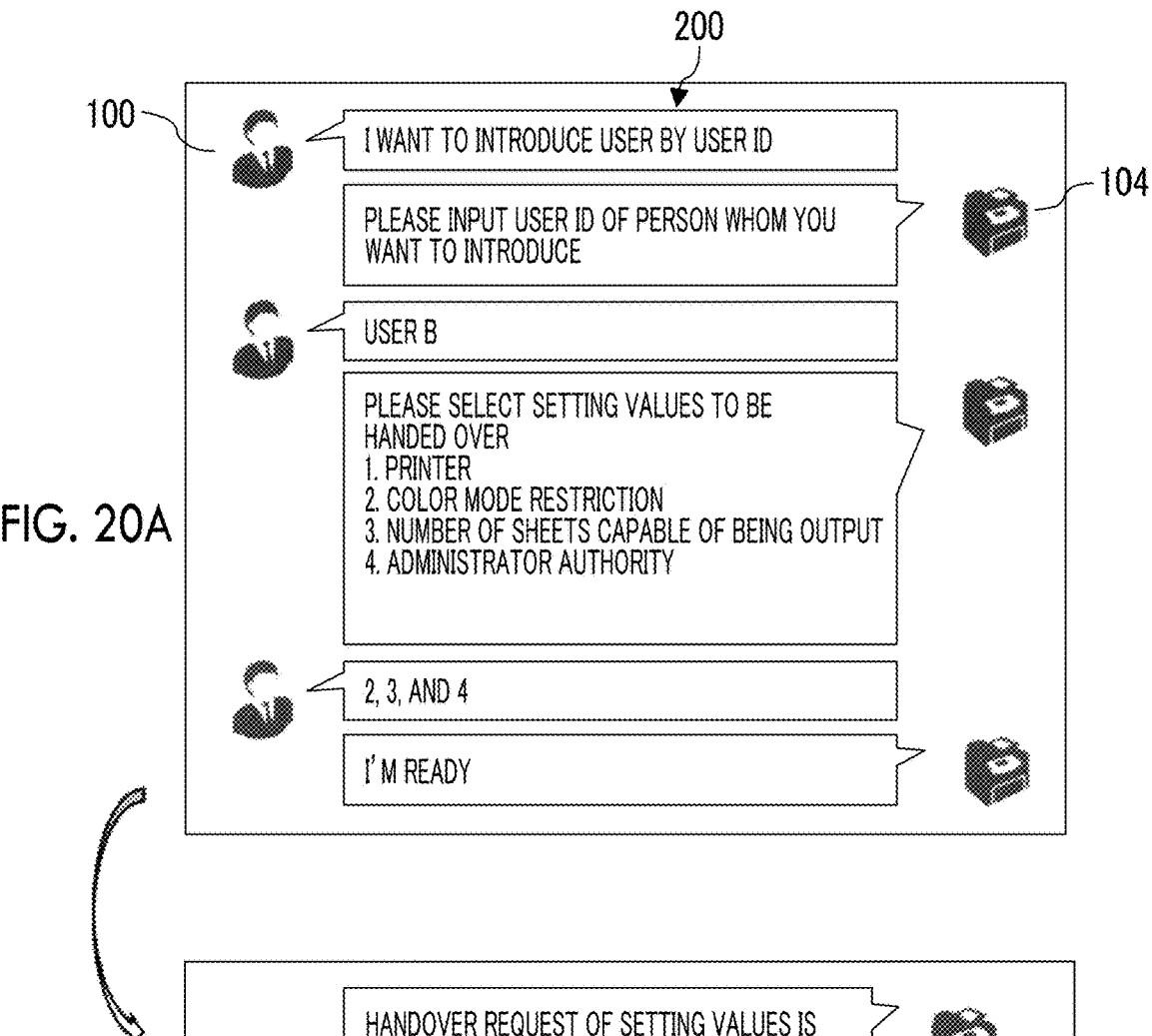
FIGS. 20A and 20B are diagrams illustrating a display of a screen of a user terminal in a seventh exemplary embodiment.
Figure 20B:
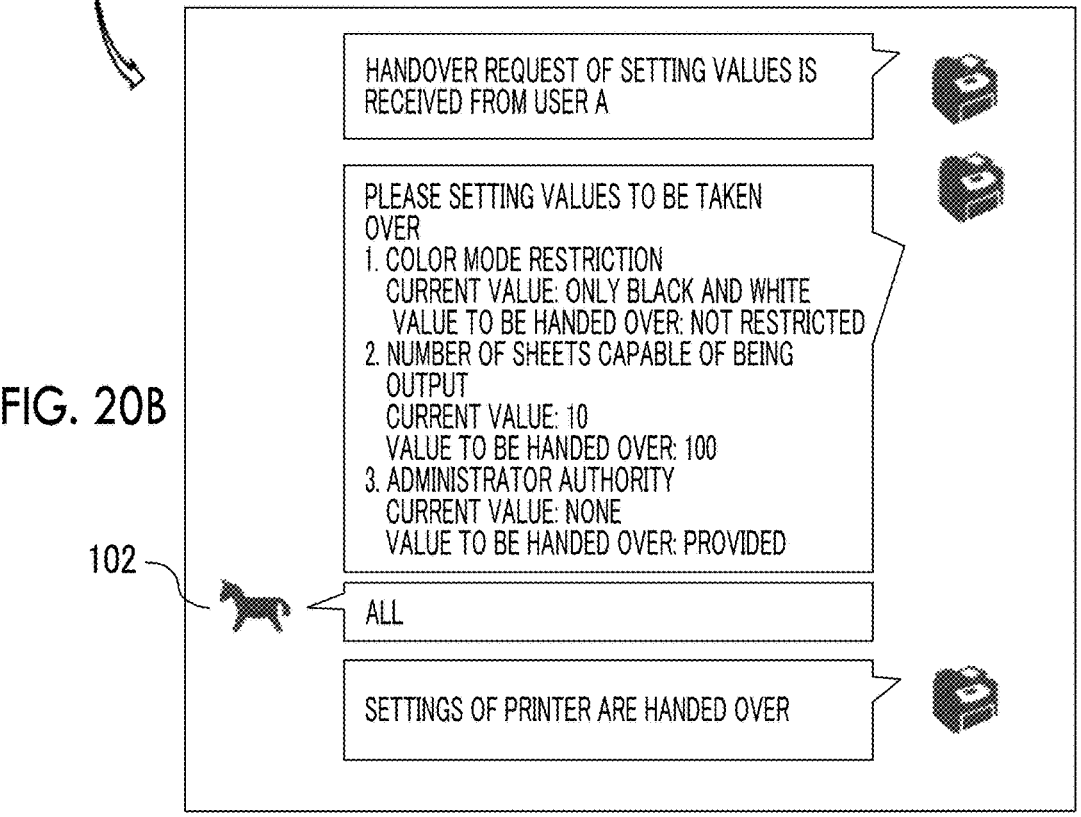

FIGS. 20A and 20B illustrate another example of the case where the user B uses a portion of the setting information of the user A. This example describes a case where the user B already registers the setting information of the user B in the setting information table and overwrites the setting information of the user B with the setting information of the user A. Items of color mode restriction, the number of sheets capable of being output, and an administrator authority are registered in the setting information table of the user A and the user B, in addition to the printer. For example, the user A registers the setting information in which the printer is 001, the color mode restriction is none, the number of sheets capable of being output is 100, and the administrator authority is provided. The user B registers the setting information in which printer is 001, the color mode restriction is only black and white, the number of sheets capable of being output is 10, and the administrator authority is none.

FIG. 20A illustrates a screen example displayed in the user terminal A. The user A transmits a message of "wanting to introduce a user by a user ID".

The chatbot receiving the message analyzes the contents of the message. The chatbot transitions to a pre-registration mode and automatically transmits a message of "please input a user ID of a person whom you want to introduce", as a response.

The user B who has visually recognizes the message transmits a message of "user B" to the chatbot.

The chatbot receiving the message extracts a user ID (user ID of the user B) included in the message. The chatbot creates a new entry in which the user ID of the user B is set as the user, in the setting information table. In a case where the entry of the user B is already provided, it is not necessary that the entry of the user B is newly created. The confirmation flag is set to be X (not confirmed). The chatbot automatically transmits a message as follows as a response.

"Please select the setting values to be handed over.
1. Printer
2. Color mode restriction
3. Number of sheets capable of being output
4. Administrator authority".

The user A which has visually recognized the message transmits a message of "2, 3, and 4" in a case where the user A wants to hand values of the color mode restriction, the number of sheets capable of being output, and the administrator authority over to the user B.

The chatbot receiving the message temporarily stores the setting information of the user A and the current setting information of the user B, regarding the color mode restriction, the number of sheets capable of being output, and the administrator authority in the entry of the user B in the setting information table. The chatbot automatically transmits a message of "I'm ready".

FIG. 20B illustrates the screen example displayed in the user terminal B. When the confirmation flag of the user B in the setting information table is set to be X (not confirmed), the chatbot automatically transmits messages as follows as a response, with reference to the setting information of the user A and the current setting information of the user B, which have been temporarily stored:

"A handover request of setting values is received from the user A" and

"Please select the setting values to be taken over.
1. Color mode restriction
current value: only black and white
value to be handed over: not restricted
2. Number of sheets capable of being output
current value: 10
value to be handed over: 100
3. Administrator authority
current value: none
value to be handed over: provided".

Here, the current value means the setting value of the user B, which has already been registered in the setting information table. The value to be handed over means the setting value of the user A, which has already been registered in the setting information table. The user B who has visually recognized the message transmits a message of "all", for example.

The chatbot receiving the message copies the setting information of the user A as the setting information of the user B. The chatbot updates the confirmation flag from X to O and automatically transmits a message of "settings of the printer are handed over" as a response.

Thus, the user B may update the restriction of the current setting value and perform an update to the restriction which is equal to that for the user A, only by simply transmitting a message.

Hitherto, the exemplary embodiments of the invention are described. However, the invention is not limited to the above-described exemplary embodiments, and various modifications may be made. Modification examples will be described below.

Modification Example 1

In the above exemplary embodiments, a case where the user B uses the setting information registered by the user A is described as an example. However, even in a case where a plurality of users, for example, a user B and a user C use the setting information registered by the user A, processing similar to that in the above exemplary embodiment may be performed. In this case, any of (i) a case where the user A transmits a message of introducing the user B and the user C, (ii) a case where the user B and the user C transmit a message indicating using the setting information of the user A, and (iii) a case where the user A transmits a message of introducing the user B and the user C in the same group chat, and the user B and the user C transmit a message indicating using the setting information of the user A is possible. For example, in a case where descriptions are made based on the first exemplary embodiment, firstly, the user A transmits a message of "wanting to introduce a user in the chat room" to the chatbot.

The chatbot receiving the message analyzes the contents of the message. In a case where the chatbot extracts a keyword of "introduction" and the like, the chatbot transitions to an introduction mode. Then, the chatbot extracts a user ID included in the message, that is, a user ID of the user A as an introducer, and stores the user ID in a memory such as a RAM. The response message creation unit 164 creates a response message and automatically transmits a message of "please a user who wants to register the printer respond" and a message of "would you like to take the output printer over? (yes/no), as the response.

Then, each of the user B and the user C who have visually recognized the message transmits a message of "yes".

The chatbot receiving the message extracts a user ID included in the message, that is, user IDs of the user B and the user C as persons to be introduced, and stores the user IDs. The chatbot analyzes the contents of the message. In a case where the contents are positive, that is, "yes", the chatbot associates the user IDs of the user B and the user C with the printer ID of the printer A associated with the user ID of the user A as the introducer. The response message creation unit 164 creates a response message, and automatically transmits a message of "would you like to take the output settings over? (yes/no)" as a response.

It is assumed that the user B and the user C who have visually recognized the message transmit a message of "yes".

The chatbot receiving the message extracts the user IDs included in the message, that is, the user IDs of the user B and the user B as the persons to be introduced. Because the extracted user IDs are the same as the user IDs of the user B and the user C as the persons who are to be introduced and requires handover of setting registration, the chatbot analyzes the contents of the message. In a case where the contents are positive, that is, "yes", the chatbot associates the user IDs of the user B and the user C with setting information associated with the user ID of the user A as the introducer. That is, the chatbot copies the setting information of the user A and pastes the setting information as setting information of the user B and the user C. Then, the chatbot automatically transmits a message of "handover is completed" as a response.

Modification Example 2

In the second exemplary embodiment and the like, as illustrated in FIGS. 11A and 11B, in a case where friend registration is performed between the user B and the chatbot, the chatbot automatically the messages of "welcome to the print bot", "settings of the introducer are provided", and "would you like to take the output printer over? (yes/no)", as a response to the friend registration. However, in a case where the user B is introduced by the user A, the chatbot may automatically transmit a message of urging friend registration with the user B, as a response.

For example, in a case where the user B enters the chat room, the chatbot detects that the user enters the chat room, and automatically transmits a message of "since you are introduced by the introducer, firstly, please perform friend registration with the print bot", as a response. The chatbot may automatically transmit a confirmation message such as "settings of the introducer are capable of being used by performing friend registration with the print bot", as a response.

In a case where the user B who visually recognized the message performs friend registration, the chatbot transitions to the screen illustrated in FIG. 11B, and thus allows the user B to use the setting information.

The chatbot may automatically perform friend registration with the user B corresponding to a point that the user B has taken over the settings of the user A or a point that the user B transmits an expression of an intention to take over the settings of the user A by a message, instead of automatically transmitting an explicit message of urging friend registration to the user B as a response. For example, in a case where the chatbot automatically transmits the message of "settings of the introducer are provided" and "would you like to take the output printer over? (yes/no)", as a response, and the user B transmits a message of "yes" in response to the messages of the chatbot, the chatbot may consider the message of "yes" from the user B as a message for friend registration, and automatically perform friend registration. In a case where the chatbot automatically performs friend registration, the chatbot may automatically transmit a confirmation message of "friend registration has automatically been performed" as a response.

In a case where a user who has manually or automatically performed friend registration with the chatbot canceled the friend registration with the chatbot later, that is, in a case where a specific operation for using the chatbot is canceled, the chatbot may maintain the setting information itself of the user A, which has been set for the user B, in addition to bringing the setting information of the user A back to the default value.

Thus, even in a case where the user B performs friend registration with the chatbot again, the user B may use the previous setting information as it is.

Modification Example 3

In the exemplary embodiments, an example in which the chatbot provides the print service in accordance with a message from a user is described. However, the chatbot may provide any service in addition to the print service. Examples of the service are as follows.

Figure 21:
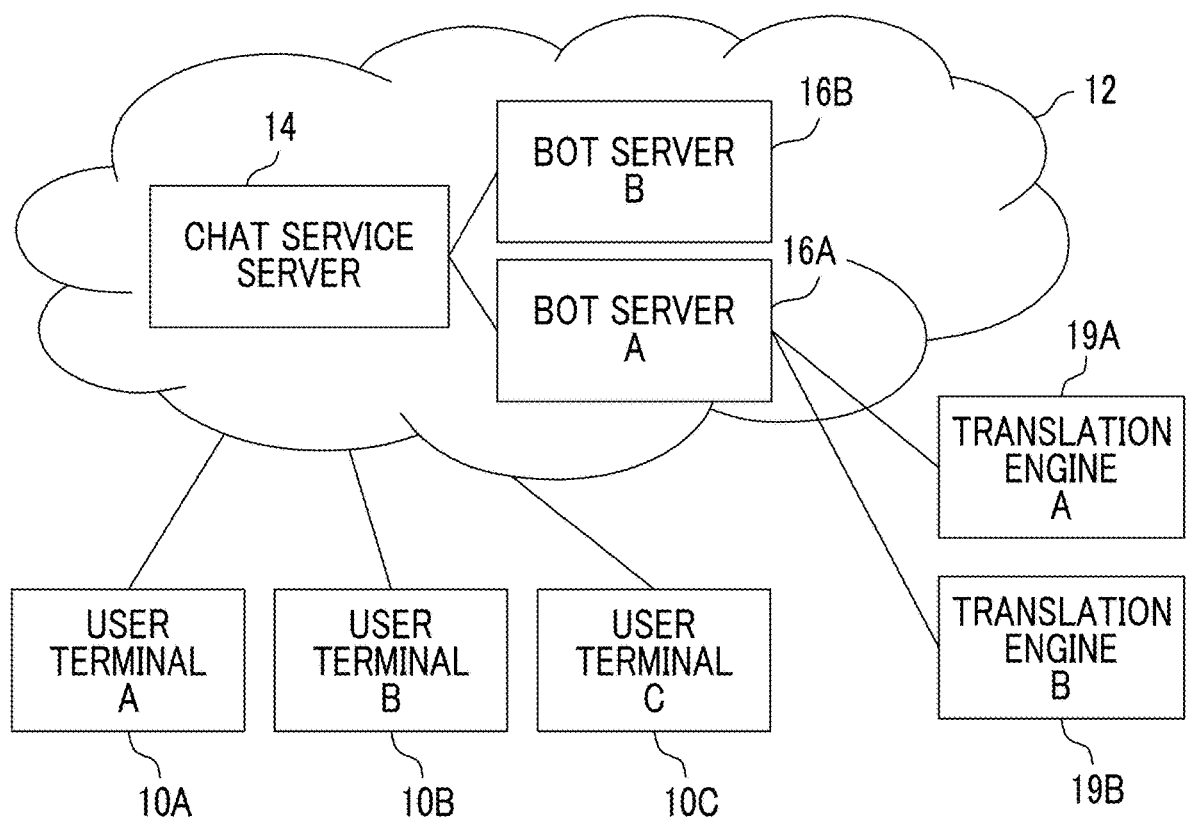
FIG. 21 is a system configuration diagram according to a modification example.

Search service of music, news articles, accommodations, books, cooking recipes, and the like Ticket reservation service Listing/search/transaction contact service to flea market Translation service to other languages FIG. 21 is a diagram illustrating a system configuration in a case where a translation service is executed. Different from FIG. 1, the system includes a translation engine A (19A) and a translation engine (19B), instead of the printer A (18A) and the printer B (18B). The translation engine A corresponds to a software robot program of translating Japanese into English. The translation engine B corresponds to a software robot program of translating Japanese into Chinese.

The user A selects the translation engine A and sets and registers a format for displaying the original Japanese following the English translation, as the setting information. Thus, in a case where the user A transmits a message of "Are you free today?" to the chatbot, the chatbot drives the translation engine A to automatically transmit a message of "今日は空いていますか?" and "Are you free today?" as a response.

In a case where the user B also uses such setting information, the setting information of the user A is copied as the setting information of the user B by being introduced by the user A or by transmitting a message indicating that the user B wants to use the setting information. Thus, the user B may use the setting information of the user A only by simply transmitting a message. In addition to the format, the field and the dictionary library may be included in the setting information.

In a case of the search service, a search engine may be used instead of the translation engine. In this case, the setting information corresponds to a search condition. For example, in the search of accommodation facilities, the number of days, the price, the grade of the hotel, and the number of people may be included in the setting information.

Figure 22:
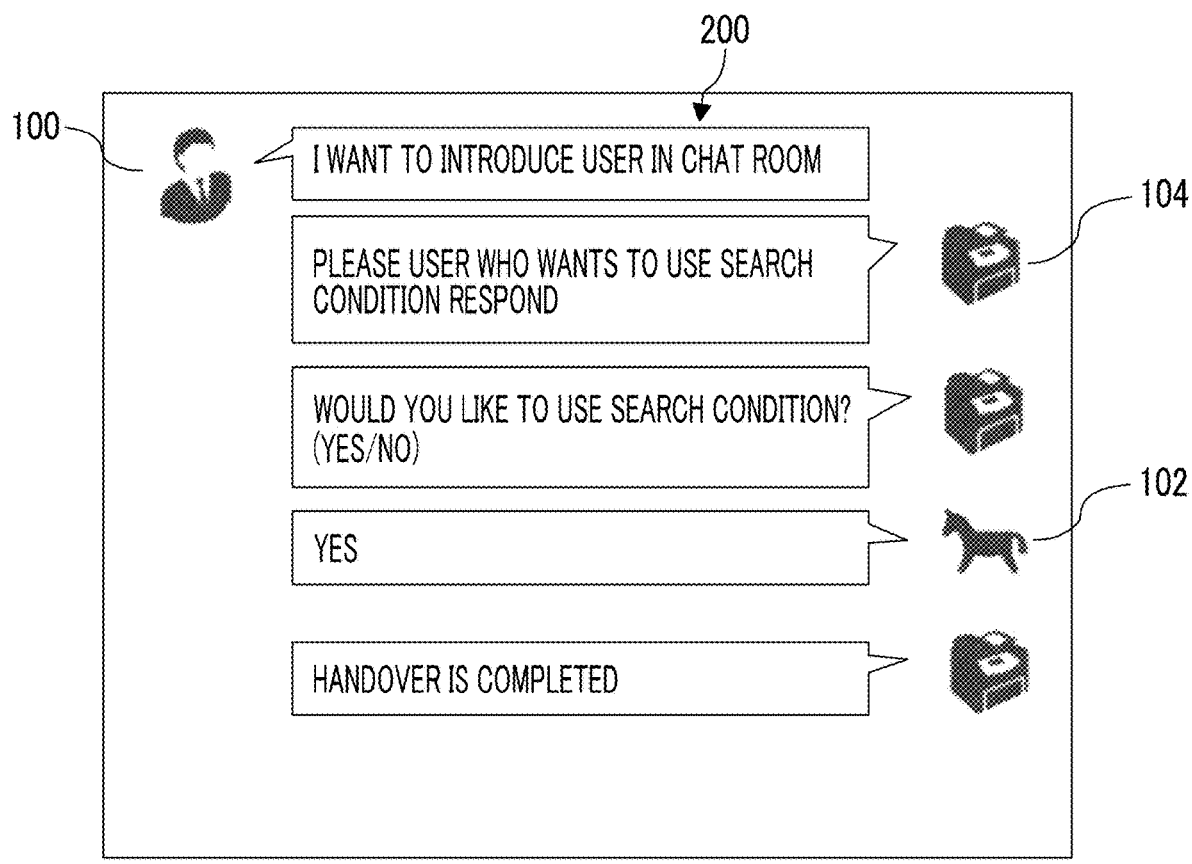
FIG. 22 is a diagram illustrating a display of a screen of a user terminal in the modification example.

FIG. 22 illustrates a screen example displayed in the user terminal A in a case where the user B uses a search condition of the user A, which has already been registered as the setting information.

In FIG. 22, firstly, the user A transmits a message of "wanting to introduce a user in the chat room" to the chatbot.

The chatbot receiving the message analyzes the contents of the message. In a case where the chatbot extracts a keyword of "introduction" and the like, the chatbot transitions to an introduction mode. Then, the chatbot extracts a user ID included in the message, that is, a user ID of the user A as an introducer, and stores the user ID in a memory such as a RAM. The response message creation unit 164 creates a response message and automatically transmits a message of "please a user who wants to use the search condition respond" and a message of "would you like to use the search condition? (yes/no)", as the response.

Then, the user B who has visually recognized the message transmits a message of "yes".

The chatbot receiving the message extracts a user ID included in the message, that is, a user ID of the user B as a person to be introduced, and stores the user ID. The chatbot analyzes the contents of the message. In a case where the contents are positive, that is, "yes", the chatbot associates the user ID of the user B with the setting information associated with the user ID of the user A as the introducer. The chatbot copies and pastes the setting information of the user A as the setting information of the user B. Then, the chatbot automatically transmits a message of "handover is completed" as a response. After that, it is not necessary that the user B newly registers setting information, and the user B may use the search condition as the setting information of the user A.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A message providing device comprising:
one or a plurality of processors configured to:
receive a registration request for setting information regarding an operation of a software robot program for each user, the software robot program operating on a message service iii which a message is transmitted and received between users, to transmit and receive the message to and from a user;
register setting information for a first user in association with identification information of the first user, in response to the registration request from the first user; and
perform control such that at least a portion of the registered setting information for the first user is registered in association with identification information of a second user, such that the at least a portion of the registered setting information is usable as setting information for the second user, in response to a message between the first user or the second user, and the software robot program.

2. The message providing device according to claim 1, wherein the one or the plurality of processors is configured to perform control such that at least the portion of the setting information for the first user is registered as the setting information for the second user in association with the identification information of the second user, in response to a message which is transmitted from the first user to the software robot program and indicates that the first user introduces the second user.

3. The message providing device according to claim 2, wherein the message for introducing the second user includes the identification information of the second user.

4. The message providing device according to claim 1, wherein the one or the plurality of processors is configured to perform control such that at least the portion of the setting information for the first user is registered as the setting information for the second user in association with the identification information of the second user, in response to a message which is transmitted from the second user to the software robot program and indicates that the second user uses the setting information for the first user.

5. The message providing device according to claim 1, wherein the one or the plurality of processors is configured to perform control such that at least the portion of the setting information for the first user is registered as the setting information for the second user in association with the identification information of the second user, in response to a message which is transmitted from the first user to the software robot program and indicates that the first user introduces the second user, and a message which is transmitted from the second user to the software robot program and indicates that the second user uses the setting information for the first user.

6. The message providing device according to claim 1, wherein the one or the plurality of processors is configured to urge the second user to perform an operation of acquiring a use authority of the software robot program, and then registers at least the portion of the registered setting information for the first user in association with the identification information of the second user, as the setting information for the second user.

7. The message providing device according to claim 6, wherein the one or the plurality of processors is configured to register the setting information for the second user, in a case where the second user has performed the operation of acquiring the use authority.

8. The message providing device according to claim 7, wherein, even in a case where the second user cancels an acquisition state of the use authority, the one or the plurality of processors is configured to maintain registration of the setting information for the second user.

9. The message providing device according to claim 6, wherein, in a case where the second user has performed the operation of acquiring the use authority, the one or the plurality of processors is configured to transmit a confirmation message for confirming that at least the portion of the setting information for the first user is registered as the setting information for the second user in association with the identification information of the second user.

10. The message providing device according to claim 6, wherein, even in a case where the second user cancels an acquisition state of the use authority, the one or the plurality of processors is configured to maintain registration of the setting information for the second user.

11. The message providing device according to claim 1, wherein, in a case where at least the portion of the registered setting information for the first user is registered as the setting information for the second user in association with the identification information of the second user, the one or the plurality of processors is configured to determine that the second user has performed the operation of acquiring the use authority of the software robot program.

12. The message providing device according to claim 1, wherein, in a case where at least the portion of the registered setting information for the first user is registered as the setting information for the second user in association with the identification information of the second user, the one or the plurality of processors is configured to perform registration in response to a selection message from the first user.

13. The message providing device according to claim 1, wherein, in a case where at least the portion of the registered setting information for the first user is registered as the setting information for the second user in association with the identification information of the second user, the one or the plurality of processors is configured to perform registration in response to a selection message from the second user.

14. The message providing device according to claim 1, wherein the software robot program provides a service in response to a message from the first user or the second user, and the setting information is information for defining contents of the service.

15. The message providing device according to claim 14, wherein the service is provided in cooperation with an external device, and the setting information includes identification information for uniquely specifying the external device.

16. The message providing device according to claim 14, wherein the service is provided in cooperation with an external device, and the setting information includes information regarding an operation condition of the external device.

17. The message providing device according to claim 16, wherein the external device is a printing device, and the operation condition is a printing condition of the printing device.

18. A non-transitory computer readable medium storing a program causing a computer to operate as:
a receiving section that receives a registration request for setting information regarding an operation of a software robot program for each user, the software robot program operating on a message service in which a message is transmitted and received between users, to transmit and receive the message to and from a user;
a registration section that registers setting information for a first user in association with identification information of the first user, in response to the registration request from the first user; and
a control section that performs control such that at least a portion of the registered setting information for the first user is registered in association with identification information of a second user, such that the at least a portion of the registered setting information is usable as setting information for the second user, in response to a message between the first user or the second user, and the software robot program.

* * * * *